United States Patent
Chiang et al.

(10) Patent No.: US 9,583,780 B2
(45) Date of Patent: Feb. 28, 2017

(54) FUEL SYSTEM USING REDOX FLOW BATTERY

(71) Applicant: 24M Technologies, Inc., Cambridge, MA (US)

(72) Inventors: Yet-Ming Chiang, Weston, MA (US); Ricardo Bazzarella, Woburn, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 15/045,718

(22) Filed: Feb. 17, 2016

(65) Prior Publication Data

US 2016/0268621 A1    Sep. 15, 2016

Related U.S. Application Data

(63) Continuation of application No. 14/824,664, filed on Aug. 12, 2015, now Pat. No. 9,293,781, which is a
(Continued)

(51) Int. Cl.
*H01M 8/18* (2006.01)
*B60L 11/18* (2006.01)
(Continued)

(52) U.S. Cl.
CPC .......... *H01M 8/188* (2013.01); *B60L 11/1816* (2013.01); *B60L 11/1822* (2013.01); *B60L 11/1874* (2013.01); *B60L 11/1879* (2013.01); *H01M 4/8626* (2013.01); *H01M 4/94* (2013.01); *H01M 8/0432* (2013.01); *H01M 8/0438* (2013.01); *H01M 8/04208* (2013.01); *H01M 8/04604* (2013.01); *H01M 8/04753* (2013.01); *H01M 8/20* (2013.01); *H01M 8/225* (2013.01); *H01M 4/8631* (2013.01); *H01M 8/04626* (2013.01); *H01M 2004/8694* (2013.01); *H01M 2250/20* (2013.01); *H01M 2250/30* (2013.01); *Y02B 90/18* (2013.01); *Y02E 60/528* (2013.01); *Y02T 10/7005* (2013.01); *Y02T 10/705* (2013.01); *Y02T 10/7072* (2013.01);
(Continued)

(58) Field of Classification Search
None
See application file for complete search history.

(56) References Cited

U.S. PATENT DOCUMENTS 4,814,240 A  *  3/1989  Zaromb ............... B60L 11/1879
                                                            429/422

\* cited by examiner

*Primary Examiner* — Patrick Ryan
*Assistant Examiner* — Wyatt McConnell
(74) *Attorney, Agent, or Firm* — Cooley LLP

(57) ABSTRACT

An automotive or other power system including a flow cell, in which the stack that provides power is readily isolated from the storage vessels holding the cathode slurry and anode slurry (alternatively called "fuel") is described. A method of use is also provided, in which the "fuel" tanks are removable and are separately charged in a charging station, and the charged fuel, plus tanks, are placed back in the vehicle or other power system, allowing fast refueling. The technology also provides a charging system in which discharged fuel is charged. The charged fuel can be placed into storage tanks at the power source or returned to the vehicle. In some embodiments, the charged fuel in the storage tanks can be used at a later date. The charged fuel can be transported or stored for use in a different place or time.

21 Claims, 11 Drawing Sheets

Related U.S. Application Data continuation of application No. 14/306,610, filed on Jun. 17, 2014, now abandoned, which is a continuation of application No. 12/755,379, filed on Apr. 6, 2010, now Pat. No. 8,778,552.

(60) Provisional application No. 61/235,859, filed on Aug. 21, 2009, provisional application No. 61/166,958, filed on Apr. 6, 2009.

(51) Int. Cl.
*H01M 8/04* (2016.01)
*H01M 8/22* (2006.01)
*H01M 8/20* (2006.01)
*H01M 4/94* (2006.01)
*H01M 4/86* (2006.01)

(52) U.S. Cl.
CPC .............. *Y02T 90/124* (2013.01); *Y02T 90/14* (2013.01); *Y02T 90/32* (2013.01)

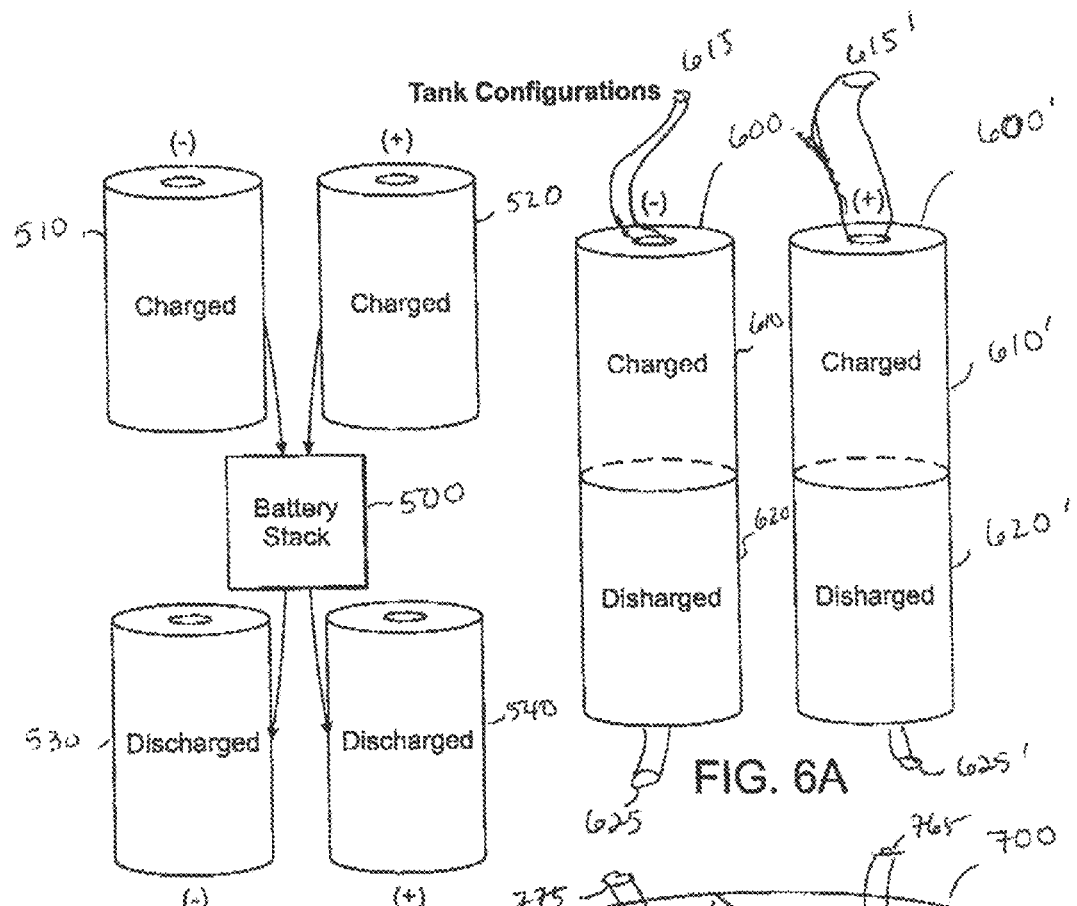
FIG. 5
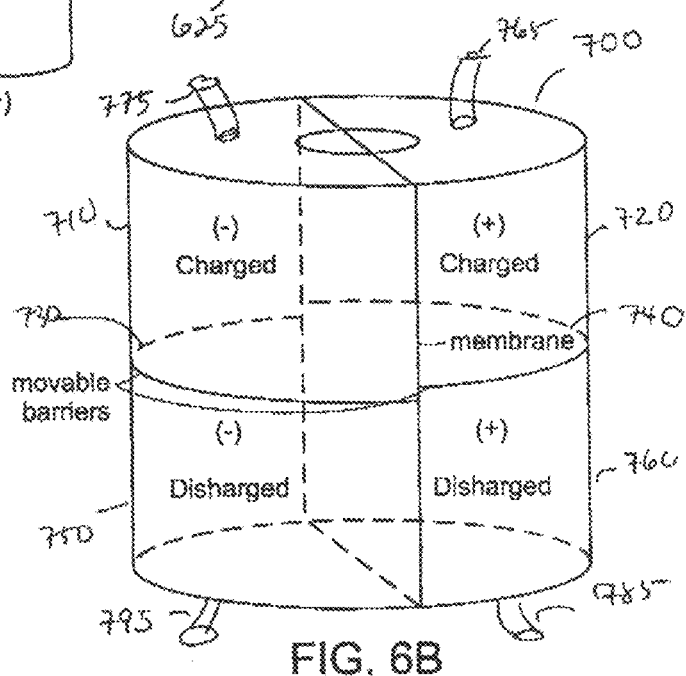
FIG. 6A
FIG. 6B

FUEL SYSTEM USING REDOX FLOW BATTERY

RELATED APPLICATIONS

This application is a continuation of U.S. patent application Ser. No. 14/824,664, filed Aug. 12, 2015, now U.S. Pat. No. 9,293,781, entitled "Fuel System Using Redox Flow Battery," which is a continuation of U.S. patent application Ser. No. 14/306,610, filed Jun. 17, 2014, entitled "Fuel System Using Redox Flow Battery," which is a continuation of U.S. patent application Ser. No. 12/755,379, filed Apr. 6, 2010, now U.S. Pat. No. 8,778,552, entitled "Fuel System Using Redox Flow Battery," which claims priority to and the benefit of U.S. Provisional Application No. 61/235,859, filed on Aug. 21, 2009, entitled "Fuel System Using Redox Flow Battery," and U.S. Provisional Application No. 61/166,958, filed on Apr. 6, 2009, entitled "Fuel System Using Redox Flow Battery," the disclosures of which are hereby incorporated by reference in their entirety.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

Redox flow batteries, also known as a flow cells or redox batteries or reversible fuel cells, are energy storage devices in which the positive and negative electrode reactants are soluble metal ions in liquid solution that are oxidized or reduced during the operation of the cell. Using two soluble redox couples, one at the positive electrode and one at the negative electrode, solid-state reactions are avoided. A redox flow cell typically has a power-generating assembly comprising at least an ionically transporting membrane separating the positive and negative electrode reactants (also called cathode slurry and anode slurry, respectively), and positive and negative current collectors (also called electrodes) which facilitate the transfer of electrons to the external circuit but do not participate in the redox reaction (i.e., the current collector materials themselves do not undergo Faradaic activity).

Differences in terminology for the components of a flow battery and those of conventional primary or secondary batteries are herein noted. The electrode-active solutions in a flow battery are typically referred to as electrolytes, and specifically as the cathode slurry and anode slurry, in contrast to the practice in lithium ion batteries where the electrolyte is solely the ion transport medium and does not undergo Faradaic activity. In a flow battery the non-electrochemically active components at which the redox reactions take place and electrons are transported to or from the external circuit are known as electrodes, whereas in a conventional primary or secondary battery they are known as current collectors.

While redox flow batteries have many attractive features, including the fact that they can be built to almost any value of total charge capacity by increasing the size of the cathode slurry and anode slurry reservoirs, one of their limitations is that their energy density, being in large part determined by the solubility of the metal ion redox couples in liquid solvents, is relatively low. The extent to which metal ion solubilities may be increased is limited.

In the field of aqueous electrolyte batteries, and specifically batteries that utilize zinc as an electroactive material, electrolytes that comprise a suspension of metal particles and in which the suspension is flowed past the membrane and current collector, have been described. See for example U.S. Pat. Nos. 4,126,733 and 5,368,952 and European Patent EP 0330290B1. The stated purpose of such electrodes is to prevent detrimental Zn metal dendrite formation, to prevent detrimental passivation of the electrodes, or to increase the amount of zincate that can be dissolved in the positive electrode as the cell discharges. However, the energy density of such aqueous batteries even when electrolytes with a suspension of particles are used remains relatively low. Such batteries cannot provide a high enough specific energy to permit practical operation of an electric vehicle, nor do they provide a substantial improvement in specific energy or energy density over conventional redox batteries for stationary energy storage, including for example applications in grid services or storage of intermittent renewable energy sources such as wind and solar power.

SUMMARY

Swappable fuel tank for fueled vehicles using flow cells is described. The swappable fuel tank includes a cathode slurry and/or an anode slurry that can be used in a redox flow battery to generate power. As described in greater detail below, the anode and cathode slurries flow past an ion permeable membrane and electrodes connected to an external circuit and thereby engage in redox chemistry. The swappable fuel tanks and the flow battery cells (in combination referred to as a "stack") are referred to, in combination, as the 'power system.' The fuel tank is configured to be easily removed from the power system and easily emptied and refilled. Thus, spent fuel can be replaced and/or the quality or properties can be varied from filling to filling to provide greater versatility or functionality to the power system.

In other embodiments, the power system is equipped with internal monitoring capability so that the state of the battery is known. Power system attributes that may be monitored can provide information of the state of charge of the anode and cathode slurries, i.e., whether the tank 'full' or 'empty'. The monitoring system can also provide information regarding other properties of the system to generally provide information about the state of health of the power system and identify conditions that can be dangerous or require correction.

In another aspect, the power system can include an electrical energy storage device and power source that is simultaneously a conventional rechargeable battery and a flow cell in one integrated device. It is applicable to various battery chemistries, including aqueous batteries such as nickel metal hydride types, and nonaqueous batteries including lithium rechargeable batteries, sodium rechargeable batteries, or batteries based on other alkali or alkaline earth or non-alkaline working ions. Considering one embodiment based on lithium ion chemistry, the basic construction of such a cell has a separator, on one side of which is a lithium battery positive electrode or a negative electrode, or both, as in a conventional rechargeable lithium battery. That is, said electrodes comprise cathode or anode active material, and may comprise a coating of the active material on a metallic current collector, or may be a stand-alone electrode layer such as a densified or sintered layer comprising the active material, optionally with other constituents such as polymer binders or carbonaceous conductive additives or metallic additives or binders. These ion-storage electrodes will be referred to as the stationary electrodes. However, unlike a conventional lithium battery electrode, one or both of said stationary electrodes is permeable to a flow cell cathode slurry or anode slurry, so that during operation of the device, it is possible to charge or discharge only the active materials on the stationary electrode, only the flow cell cathode slurry or anode slurry, or both.

In one or more embodiments, the redox flow batteries have a multi-cell stack design including semi-solid or condensed liquid reactant in anode slurry or cathode slurry. In some embodiments, the redox flow batteries are connected to anode slurry and cathode slurry storage tanks through flow valves and pumps. In some embodiments, the direction of the flow of the anode slurry/cathode slurry can be reversed depending on the charge/discharge stages of the anode slurry/cathode slurry. In some specific embodiments, the storage tank include a bladder which stores the discharged semi-solid or condensed liquid reactant the discharged material can be transferred back into the device for charging. In some embodiments, the semi-solid or condensed liquid reactant is introduced into each cell compartment of the stacked cell through a manifold. In some embodiments, valves can be installed on the manifold. In some embodiments, the valve can be positioned just before the inlet of the cell compartment. In some embodiments, the valve can be positioned just after the outlet of the cell compartment. The valves can reduced the risk of short-circuit of the system.

In some embodiments, one or more injectors are connected to the manifold of the semi-solid multi-stack cell and pressurized regions (plenum) are formed within the manifold. The plenum can be used to deliver cathode slurry or anode slurry into a single cell compartment or a group of cell compartments.

In some embodiments, the semi-solid or condensed liquid redox flow multi-cell stack can be assembled by stacked plates. The manifolds of the redox flow multi-cell stack are formed by stacking plates together. In some specific embodiments, the inside surfaces of the manifold can be coated with non-electrically-conducting material to minimize shunt current across liquid.

In one aspect, a method of operating a portable device including a power system housed within the device is described, including:
providing a plurality of flow cells, each flow cell comprising:
a positive electrode current collector,
a negative electrode current collector,
an ion-permeable membrane separating the positive and negative current collectors;
wherein the positive electrode current collector and the ion-permeable membrane define a positive electroactive zone for accommodating a positive electroactive material;
wherein the negative electrode current collector and the ion-permeable membrane define a negative electroactive zone for accommodating a negative electroactive material; wherein at least one of the positive and negative electroactive materials comprises a flowable redox composition in the electroactive zone:
at least one dispensing vessel for dispensing a flowable redox composition into one of the positive or negative electroactive zone; wherein the dispensing vessel is connected with the plurality of flow cells and in fluidic communication with the electroactive zone and the dispensing vessel is capable of being connected and disconnected from the flow cell; and
at least one receiving vessel for receiving flowable redox composition from one of the positive or negative electroactive zone, wherein the receiving vessel is connected with the flow cell and in fluidic communication with said electroactive zone and the receiving vessel is capable of being connected and disconnected from the flow cell;
introducing the flowable redox composition from the dispensing vessel into at least one of the electroactive zones to cause the flow cell to discharge to provide electric energy to operate the device; and
receiving the discharged redox composition in the receiving vessel.

In any preceding embodiment, the method further includes refueling the power system by replacing the dispensing vessel with a new dispensing vessel containing fresh flowable redox composition.

In any preceding embodiment, the method further includes replacing the receiving vessel with a new empty receiving vessel.

In any preceding embodiment, the portable device is a vehicle.

In any preceding embodiment, the portable device is a portable power generator.

In any preceding embodiment, the vehicle is a land, air, or water vehicle.

In any preceding embodiment, the redox composition comprises a flowable semi-solid or condensed liquid ion-storing redox composition capable of taking up and releasing the ions during operation of the cell.

In any preceding embodiment, the method further includes refueling the power system by replacing the dispensing vessel containing the redox composition with a new dispensing vessel containing a fresh flowable redox composition.

In any preceding embodiment, the fresh redox composition has at least one different characteristic from the redox composition.

In any preceding embodiment, the fresh redox composition and the redox composition has different power densities.

In any preceding embodiment, the fresh redox composition and the redox composition has different energy densities.

In any preceding embodiment, the fresh redox composition and the redox composition has different semi-solid particle sizes.

In any preceding embodiment, the fresh redox composition and the redox composition has different electroactive material concentrations.

In any preceding embodiment, the fresh redox composition has smaller semi-solid particle size and higher power density than the redox composition.

In any preceding embodiment, the fresh redox composition has higher electroactive material concentration and higher energy density than the redox composition.

In any preceding embodiment, the dispensing vessel and receiving vessel form a unitary body.

In any preceding embodiment, the plurality of flow cells form a stack of flow cells, and the dispensing and receiving vessels are reversibly connected with the flow cell stack.

In any preceding embodiment, the flow cells are connected in parallel.

In any preceding embodiment, the flow cells are connected in series.

In any preceding embodiment, the method further includes providing comprising a pump disposed between one or both of the dispensing and receiving vessels and the flow cell stack.

In any preceding embodiment, the pump is a reversible flow pump that is operable for flow in both directions.

In any preceding embodiment dispensing or receiving vessels comprise a flexible bladder.

In any preceding embodiment, the method further includes valves positioned at the entrance of each fuel cell to control the flow of redox composition into the respective flow cell and minimize shunt current between adjacent flow cells.

In any preceding embodiment, the method further includes providing a multiport injection system configured and arranged to control the amount of redox composition delivered to each electroactive zone of each flow cell.

In any preceding embodiment, the multiport injection system comprises a plurality of compartments, each compartment in flow communication with a subset of the flow cells in the flow cell stack and injectors for introducing redox composition into each compartment.

In any preceding embodiment, the pressure in the plurality of compartment is greater than the pressure in the electroactive zone pressure.

In any preceding embodiment, the method further includes comprising a cooling system for circulating a coolant in the flow cell stack.

In any preceding embodiment, the method further includes providing a monitoring meter connected to one or both of the dispensing and receiving vessels for monitoring the volume or content of the redox composition in one or both of the dispensing or receiving vessel.

In any preceding embodiment, the method further includes replenishing the dispensing vessel with fresh redox composition.

In any preceding embodiment, replenishing the dispensing vessel comprises introducing new redox composition into the dispensing vessel.

In any preceding embodiment, the method further includes removing the discharged redox composition from the receiving vessel.

In any preceding embodiment, removing the discharged redox composition from the receiving vessel comprises emptying the receiving vessel of discharged redox composition.

In any preceding embodiment, the dispensing and receiving vessel form a unitary body, the unitary body having a movable membrane between the receiving and dispensing compartments and the method further comprises replacing the unitary body with a new unitary body comprising a power storage vessel containing fresh flowable semi-solid or condensed liquid ion-storing redox compositions and an empty spent redox composition storage vessel.

In any preceding embodiment, the method further includes monitoring the levels of the flowable redox compositions in the dispensing or receiving vessels.

In any preceding embodiment, the method further includes
reversing the direction of flow of the redox composition so that the spent redox composition flows from the receiving vessel to the electroactive zone; and
applying a reverse voltage to the power system to recharge the discharged redox composition.

In any preceding embodiment, the method further includes advancing the recharged redox composition from the electroactive zone to the dispensing vessel for storage.

In any preceding embodiment, the flow of the spent redox composition is controlled by a reversible pump.

In any preceding embodiment, the particle size of the flowable semi-solid ion-storing redox composition being discharged is selected to provide a preselected power density.

In any preceding embodiment, the load in wt percent of the flowable semi-solid ion-storing redox composition being discharged is selected to provide a preselected energy capacity of the redox composition.

In any preceding embodiment, the method further includes monitoring the condition of the redox composition before during or after discharge.

In any preceding embodiment, the condition monitored comprises the temperature, flow rates, or the relative amounts of the cathode or anode redox compositions.

In any preceding embodiment, the method further includes modifying a property of the redox composition based on the results of the monitoring.

In any preceding embodiment, the method further includes increasing the flow rate of the redox composition along the electroactive zone to increase the power of the flow cell.

In any preceding embodiment, the method further includes reconditioning the flowable semi-solid or condensed liquid ion-storing redox composition.

In any preceding embodiment, the reconditioning comprises
sequestering residual water from the redox composition;
adding additional salt to improve ion conductivity;
adding solvents or electrolyte additives;
adding additional solid phases including active materials used for ion storage, or conductive additives;
separating solid phases from the liquid electrolyte;
adding coagulation aids;
replacing the liquid electrolyte; or
any combination thereof.

In any preceding embodiment, at least one of the flow cells comprises:
an electrode comprising a flowable semi-solid or condensed liquid ion-storing redox composition capable of taking up and releasing the ions during operation of the cell; and
a stationary electrode.

In another aspect, a method of operating a stationary device comprising a power system housed within the device is described, comprising:
providing a plurality of flow cells, each flow cell
a positive electrode current collector,
a negative electrode current collector,
an ion-permeable membrane separating the positive and negative current collectors;
wherein the positive electrode current collector and the ion-permeable membrane define a positive electroactive zone for accommodating a positive electroactive material;
wherein the negative electrode current collector and the ion-permeable membrane define a negative electroactive zone for accommodating a negative electroactive material; wherein at least one of the positive and negative electroactive materials comprises a flowable redox composition in the electroactive zone;

at least one dispensing vessel for dispensing a flowable redox composition into one of the positive or negative electroactive zone; wherein the dispensing vessel is connected with the plurality of flow cells and in fluidic communication with the electroactive zone and the vessel is capable of being connected and disconnected from the flow cell; and at least one receiving vessel for receiving flowable redox composition from one of the positive or negative electroactive zone, wherein the receiving vessel is connected with the flow cell and in fluidic communication with the electroactive zone and the vessel is capable of being connected and disconnected from the flow cell;

introducing the flowable redox composition from the dispensing vessel into at least one of the electroactive zones to cause the flow cell to discharge to provide electric energy to operate the device; and receiving the discharged redox composition in the receiving vessel.

In any preceding embodiment, the method further includes further comprising refueling the power system by replacing the dispensing vessel with a new dispensing vessel containing fresh flowable redox composition.

In any preceding embodiment, the method further includes replacing the receiving vessel with a new empty receiving vessel.

In any preceding embodiment, the stationary device is a stationary power generator.

In any preceding embodiment, the redox composition comprises a flowable semi-solid or condensed liquid ion-storing redox composition capable of taking up and releasing the ions during operation of the cell.

In any preceding embodiment, the method further includes refueling the power system by replacing the dispensing vessel containing the redox composition with a new dispensing vessel containing a fresh flowable redox composition.

In any preceding embodiment, the fresh redox composition has at least one different characteristics from the redox composition.

In any preceding embodiment, the fresh redox composition and the redox composition has different power densities.

In any preceding embodiment, the fresh redox composition and the redox composition has different energy densities.

In any preceding embodiment, the plurality of flow cells form a stack of flow cells, and the dispensing and receiving vessels are reversibly connected with the flow cell stack.

In any preceding embodiment, the method further includes providing a monitoring meter connected to one or both of the dispensing and receiving vessels for monitoring the volume or content of the redox composition in one or both of the dispensing or receiving vessel.

In any preceding embodiment, the dispensing and receiving vessel form a unitary body, the unitary body having a movable membrane between the receiving and dispensing compartments and the method further comprises replacing the unitary body with a new unitary body comprising a power storage vessel containing fresh flowable semi-solid or condensed liquid ion-storing redox compositions and an empty spent redox composition storage vessel.

In any preceding embodiment, the method further includes reversing the direction of flow of the redox composition so that the spent redox composition flows from the receiving vessel to the electroactive zone; and applying a reverse voltage to the power system to recharge the discharged redox composition.

In yet another aspect, a vehicle comprising a power system housed within the vehicle is described, the power system comprising:

a plurality of flow cells, each flow cell comprising:
a positive electrode current collector,
a negative electrode current collector,
an ion-permeable membrane separating the positive and negative current collectors;
wherein the positive electrode current collector and the ion-permeable membrane define a positive electroactive zone for accommodating a positive electroactive material;
wherein the negative electrode current collector and the ion-permeable membrane define a negative electroactive zone for accommodating a negative electroactive material; wherein at least one of the positive and negative electroactive materials comprises a flowable redox composition in the electroactive zone;

at least one dispensing vessel for dispensing a flowable redox composition into one of the positive or negative electroactive zone; wherein the dispensing vessel is connected with the plurality of flow cells and in fluidic communication with the electroactive zone and the vessel is capable of being connected and disconnected from the flow cell; and at least one receiving vessel for receiving flowable redox composition from one of the positive or negative electroactive zone, wherein the receiving vessel is connected with the flow cell and in fluidic communication with the electroactive zone and the vessel is capable of being connected and disconnected from the flow cell; wherein the dispensing vessel and are located to provide access for removal and replacing.

In any preceding embodiment, the power system is capable of being refueled by replacing the dispensing vessel containing the flowable redox composition with a new dispensing vessel containing fresh flowable redox composition.

In any preceding embodiment, the receiving vessel is capable of being replaced with a new empty receiving vessel.

In any preceding embodiment, the redox composition comprises a flowable semi-solid or condensed liquid ion-storing redox composition capable of taking up and releasing the ions during operation of the cell.

In any preceding embodiment, the power system is capable of being refueled by replacing the dispensing vessel containing the flowable redox composition with a new dispensing vessel containing fresh flowable redox composition.

In any preceding embodiment, the fresh redox composition has at least one different characteristic from the redox composition.

In any preceding embodiment, the fresh redox composition and the redox composition has different power densities.

In any preceding embodiment, the fresh redox composition and the redox composition has different energy densities.

In any preceding embodiment, the fresh redox composition and the redox composition has different semi-solid particle sizes.

In any preceding embodiment, the fresh redox composition and the redox composition has different electroactive material concentrations.

In any preceding embodiment, the dispensing vessel and receiving vessel form a unitary body.

In any preceding embodiment, the plurality of flow cells form a stack of flow cells, and the dispensing and receiving vessels are reversibly connected with the flow cell stack.

In any preceding embodiment, the power system further comprising a pump disposed between one or both of the dispensing and receiving vessels and the flow cell stack.

In any preceding embodiment, the pump is a reversible flow pump that is operable for flow in both directions.

In any preceding embodiment, the dispensing and receiving vessels comprise a flexible bladder.

In any preceding embodiment, the vehicle further includes valves positioned at the entrance of each fuel cell to control the flow of redox composition into the respective flow cell and minimize shunt current between adjacent fuel cells.

In any preceding embodiment, the vehicle further includes a multiport injection system configured and arranged to control the amount of redox composition delivered to each electroactive zone of each flow cell.

In any preceding embodiment, the vehicle further includes a monitoring meter connected to one or both of the dispensing and receiving vessels for monitoring the volume or content of the redox composition in one or both of the dispensing or receiving vessel.

In any preceding embodiment, the dispensing and receiving vessel form a unitary body, the unitary body having a movable membrane between the receiving and dispensing compartments and the method further comprises replacing the unitary body with a new unitary body comprising a power storage vessel containing fresh flowable semi-solid or condensed liquid ion-storing redox compositions and an empty spent redox composition storage vessel.

In yet another aspect, a power system comprising, comprising:
 a plurality of flow cells, each flow cell comprising:
 a positive electrode current collector,
 a negative electrode current collector,
 an ion-permeable membrane separating the positive and negative current collectors;
 wherein the positive electrode current collector and the ion-permeable membrane define a positive electroactive zone for accommodating the positive electrode;
 wherein the negative electrode current collector and the ion-permeable membrane define a negative electroactive zone for accommodating the negative electrode;
 wherein at least one of the positive and negative electrode comprises a flowable semi-solid or condensed liquid ion-storing redox composition in the electroactive zone which is capable of taking up and releasing the ions during operation of the cell;
 at least one dispensing storage vessel for dispensing the flowable semi-solid or condensed liquid ion-storing redox composition into one of the positive or negative electroactive zone; wherein the dispensing storage vessel is connected with the plurality of flow cells and in fluidic communication with the electroactive zone and the dispensing vessel is capable of being connected and disconnected from the flow cell; and
 at least one receiving storage vessel for receiving flowable redox composition from one of the positive or negative electroactive zone, wherein the receiving vessel is connected with the flow cell and in fluidic communication with the electroactive zone and the receiving vessel is capable of being connected and disconnected from the flow cell.

In any preceding embodiment, the positive electrode comprises a cathode slurry comprising the flowable semi-solid or condensed liquid ion-storing redox compositions and the negative electrode comprises an anode slurry comprising the flowable semi-solid or condensed liquid ion-storing redox compositions.

In any preceding embodiment, the power storage vessel and the spent redox composition storage vessel form a unitary body.

In any preceding embodiment, the plurality of flow cells form a stack of flow cells, wherein each flow cell comprises at least one electrode comprising a flowable semi-solid or condensed liquid ion-storing redox composition which is capable of taking up or releasing the ions during operation of the cell; and the dispensing and receiving vessels are reversibly connected with the flow cell stack.

In any preceding embodiment, the flow cells are connected in parallel.

In any preceding embodiment, the flow cells are connected in series.

In any preceding embodiment, the power system further includes a pump disposed between one or both of the dispensing and receiving vessels and the flow cell.

In any preceding embodiment, the pump is a reversible flow pump.

In any preceding embodiment, the dispensing and receiving vessels comprise a flexible bladder.

In any preceding embodiment, the power system further includes valves positioned at the entrance of each fuel cell to control the flow of redox composition into the respective flow cell and minimize shunt current between adjacent fuel cells.

In any preceding embodiment, the power system further includes a multiport injection system configured and arranged to control the amount of redox composition delivered to each electroactive zone of each flow cell.

In any preceding embodiment, the multiport injection system comprises injectors for introducing redox composition into a compartment supplying redox composition to a sub-portion of the total flow cells.

In any preceding embodiment, the multiport injection system provides a greater compartment pressure than electroactive zone pressure to minimize shunt current between each flow cell.

In any preceding embodiment, the power system further includes a cooling system for circulating a coolant in the flow cell.

In any preceding embodiment, the power system further includes comprising a level meter connected to the power storage vessel for monitoring the state of charge of the flowable semi-solid or condensed liquid ion-storing redox composition.

In yet another aspect, a method of operating a power system is described, comprising:
 providing power system comprising:
 a plurality of flow cells, each flow cell comprising:
 a positive electrode current collector,
 a negative electrode current collector,
 an ion-permeable membrane separating the positive and negative current collectors;
 wherein the positive electrode current collector and the ion-permeable membrane define a positive electroactive zone for accommodating the positive electrode;

wherein the negative electrode current collector and the ion-permeable membrane define a negative electroactive zone for accommodating the negative electrode;

wherein at least one of the positive and negative electrode comprises a flowable semi-solid or condensed liquid ion-storing redox composition in the electroactive zone which is capable of taking up and releasing the ions during operation of the cell;

at least one dispensing storage vessel for dispensing the flowable semi-solid or condensed liquid ion-storing redox composition into one of the positive or negative electroactive zone; wherein the dispensing storage vessel is connected with the plurality of flow cells and in fluidic communication with the electroactive zone and the dispensing vessel is capable of being connected and disconnected from the flow cell, and at least one receiving storage vessel for receiving flowable redox composition from one of the positive or negative electroactive zone, wherein the receiving vessel is connected with the flow cell and in fluidic communication with the electroactive zone and the receiving vessel is capable of being connected and disconnected from the flow cell;

introducing the flowable redox composition from the dispensing vessel into at least one of the electroactive zones to cause the flow cell to discharge to provide electric energy to operate the device; and receiving the discharged redox composition in the receiving vessel.

refueling the power system by replacing the dispensing vessel containing the redox composition with a new dispensing vessel containing fresh flowable redox composition.

In any preceding embodiment, the method further includes replacing the receiving vessel with a new empty receiving vessel.

In any preceding embodiment, the fresh redox composition has at least one different characteristic from the redox composition.

In any preceding embodiment, the fresh redox composition and the redox composition has different power densities.

In any preceding embodiment, the fresh redox composition and the redox composition has different energy densities.

In any preceding embodiment, the fresh redox composition and the redox composition has different semi-solid particle sizes.

In any preceding embodiment, the fresh redox composition and the redox composition has different electroactive material concentrations.

In any preceding embodiment, the fresh redox composition has smaller semi-solid particle size and higher power density than the redox composition.

In any preceding embodiment, the fresh redox composition has higher electroactive material concentration and higher energy density than the redox composition.

In any preceding embodiment, the dispensing vessel and receiving vessel form a unitary body.

In any preceding embodiment, the plurality of flow cells form a stack of flow cells, and the dispensing and receiving vessels are reversibly connected with the flow cell stack.

In any preceding embodiment, the flow cells are connected in parallel.

In any preceding embodiment, the flow cells are connected in series.

In any preceding embodiment, the power system further comprises a pump disposed between one or both of the dispensing and receiving vessels and the flow cell stack.

In any preceding embodiment, the pump is a reversible flow pump that is operable for flow in both directions.

In any preceding embodiment, the dispensing or receiving vessels comprise a flexible bladder.

In any preceding embodiment, the method further includes providing valves positioned at the entrance of each fuel cell to control the flow of redox composition into the respective flow cell and minimize shunt current between adjacent flow cells.

In any preceding embodiment, the method further includes providing a multiport injection system configured and arranged to control the amount of redox composition delivered to each electroactive zone of each flow cell.

In any preceding embodiment, the multiport injection system comprises a plurality of compartments, each compartment in flow communication with a subset of the flow cells in the flow cell stack and injectors for introducing redox composition into each compartment.

In any preceding embodiment, the pressure in the plurality of compartment is greater than the pressure in the electroactive zone pressure.

In any preceding embodiment, the method further includes a cooling system for circulating a coolant in the flow cell stack.

In any preceding embodiment, the method further includes providing a monitoring meter connected to one or both of the dispensing and receiving vessels for monitoring the volume or content of the redox composition in one or both of the dispensing or receiving vessel.

In any preceding embodiment, the method further includes replenishing the dispensing vessel with fresh redox composition.

In any preceding embodiment, replenishing the dispensing vessel comprises introducing new redox composition into the dispensing vessel.

In any preceding embodiment, the method further includes removing the discharged redox composition from the receiving vessel.

In any preceding embodiment, removing the discharged redox composition from the receiving vessel comprises emptying the receiving vessel of discharged redox composition.

In any preceding embodiment, the dispensing and receiving vessel form a unitary body, the unitary body having a movable membrane between the receiving and dispensing compartments and the method further comprises replacing the unitary body with a new unitary body comprising a power storage vessel containing fresh flowable semi-solid or condensed liquid ion-storing redox compositions and an empty spent redox composition storage vessel.

In any preceding embodiment, the method further includes monitoring the levels of the flowable redox compositions in the dispensing or receiving vessels.

In any preceding embodiment, the method further includes
reversing the direction of flow of the redox composition so that the spent redox composition flows from the receiving vessel to the electroactive zone; and applying a reverse voltage to the power system to recharge the discharged redox composition.

In any preceding embodiment, the method further includes advancing the recharged redox composition from the electroactive zone to the dispensing vessel for storage.

In any preceding embodiment, the flow of the spent redox composition is controlled by a reversible pump.

In any preceding embodiment, the particle size of the flowable semi-solid ion-storing redox composition being discharged is selected to provide a preselected power density.

In any preceding embodiment, the load in wt percent of the flowable semi-solid ion-storing redox composition being discharged is selected to provide a preselected energy capacity of the redox composition.

In any preceding embodiment, the method further includes monitoring the condition of the redox composition before during or after discharge.

In any preceding embodiment, the condition monitored comprises the temperature, flow rates, or the relative amounts of the cathode or anode redox compositions.

In any preceding embodiment, the method further includes modifying a property of the redox composition based on the results of the monitoring.

In any preceding embodiment, the method further includes increasing the flow rate of the redox composition along the electroactive zone to increase the power of the flow cell.

In any preceding embodiment, the method further includes reconditioning the flowable semi-solid or condensed liquid ion-storing redox composition.

In any preceding embodiment, the reconditioning comprises
  sequesting residual water from the redox composition;
  adding additional salt to improve ion conductivity;
  adding solvents or electrolyte additives;
  adding additional solid phases including active materials used for ion storage, or conductive additives;
  separating solid phases from the liquid electrolyte;
  adding coagulation aids;
  replacing the liquid electrolyte; or
  any combination thereof.

In any preceding embodiment, at least one of the flow cells comprises:
  an electrode comprising a flowable semi-solid or condensed liquid ion-storing redox composition capable of taking up and releasing the ions during operation of the cell; and
  a stationary electrode.

BRIEF DESCRIPTION OF THE DRAWING

The subject matter is described with reference to the following figures, which are presented for the purpose of illustration only and are not intended to be limiting of the invention.

FIG. 5 is a illustration of a removable fuel storage system according to one or more embodiments.

FIGS. 6A-6B are illustrations of fuel tanks having a movable membrane according to one or more embodiments.

DETAILED DESCRIPTION

Figure 1:
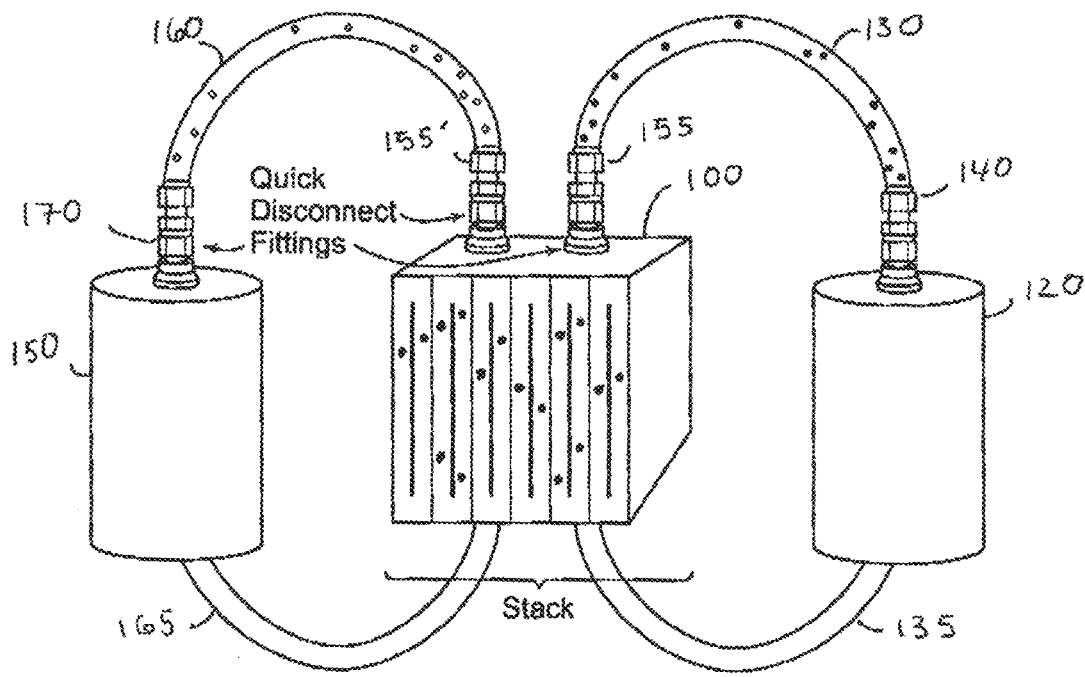
FIG. 1 is an illustration of a power system according to one or more embodiments having an energy stack and interchangeable fuel vessels.

An automotive or other power system including a flow cell, in which the stack that provides power is readily isolated from the storage vessels holding the cathode slurry and anode slurry (alternatively called "fuel") is described. A method of use is also provided, in which the "fuel" tanks are removable and are separately charged in a charging station, and the charged fuel, plus tanks, are placed back in the vehicle or other power system, allowing fast refueling. The technology also provides a charging system in which discharged fuel is charged. The charged fuel can be placed into storage tanks at the power source or returned to the vehicle. In some embodiments, the charged fuel in the storage tanks can be used at a later date. The charged fuel can be transported or stored for use in a different place or time.

A power system according to one or more embodiments includes a redox flow battery in which at least one of the positive electrode or anode slurries of the fuel is semi-solid or is a condensed liquid reactant, and in which at least one of the electrode-active materials is transported to and from an assembly at which the electrochemical reaction occurs, producing electrical energy. By "semi-solid" it is meant that the material is a mixture of liquid phase and solid phases, such a mixture also being known as a slurry, particle suspension, colloidal suspension, emulsion, or micelle. In some embodiments, the solid constituents of the semi-solid comprise at least one material that undergoes reaction or alloying or intercalation with the working ions of the battery to generate or store electrical energy. As a result, during the operation of the cell, the electroactive material of the redox couple can remain in the semi-solid in both of its oxidative states without going into solution. Therefore, the solubility of the electroactive material no longer limits its concentration in the electroactive zone, resulting in a large increase of the effective concentration of the electroactive materials in the flow cell. As a result, the energy density of the cell using semi-solid redox composition is greatly increased. The liquid supporting the electroactive component can be aqueous or non-aqueous. In some embodiments the redox flow battery comprises a non-aqueous cell, including but not limited to an alkali ion rechargeable cell wherein the working ion is an alkali ion. Solvents typically used as electrolyte solvents may be used as the liquid in the semi-solid cathode or anode slurries. As used herein, condensed liquid or condensed ion-storing liquid refers to a liquid that is not merely a solvent as it is in the case of an aqueous flow cell catholyte or anolyte, but rather that the liquid is itself redox-active. The liquid form can also be diluted by or mixed with another, non-redox-active liquid that is a diluent or solvent, including mixing with such a diluents to form a lower-melting liquid phase, emulsion or micelles including the ion-storing liquid. Similarly, during the operation of the cell, the working ion of the redox couple can remain in the condensed liquid phase in both of its oxidative states without going into solution. Therefore, the solubility of the electroactive material no longer limits its concentration in the electroactive zone, resulting in a large increase of the effective concentration of the electroactive materials in the flow cell. As a result, the energy density of the cell using condensed liquid redox composition is greatly increased.

In some embodiments the redox flow battery is a lithium battery of primary or rechargeable type. In some embodiments at least one of the energy storing electrodes comprises a condensed liquid of a redox active material, including but not limited to lithium metal, gallium and indium alloys, molten transition metal chlorides, thionyl chloride, and the like. Further information on redox batteries may be found in co-pending provisional patent application No. 61/060,972, filed Jun. 12, 2008, entitled "High Energy Density Redox Flow Battery", which is incorporated herein in its entirety by reference.

One distinction between a conventional flow battery anolyte and catholyte and the ion-storing solid or liquid phases as exemplified herein is the molar concentration or molarity of redox species in the storage compound. For example, conventional anolytes or catholytes that have redox species dissolved in aqueous solution may be limited in molarity to typically 2M to 8M concentration. Highly acidic solutions may be necessary to reach the higher end of this concentration range. By contrast, any flowable semi-solid or condensed liquid ion-storing redox composition as described herein may have, when taken in moles per liter or molarity, at least 10M concentration of redox species, preferably at least 12M, still preferably at least 15M, and still preferably at least 20M, because the solubility of the electroactive materials no longer limits it concentration in the flow cell. The electrochemically active material can be an ion storage material or any other compound or ion complex that is capable of undergoing Faradaic reaction in order to store energy. The electroactive material can also be a multiphase material including the above-described redox-active solid or liquid phase mixed with a non-redox-active phase, including solid-liquid suspensions, or liquid-liquid multi-phase mixtures, including micelles or emulsions having a liquid ion-storage material intimately mixed with a supporting liquid phase. In the case of both semi-solid and condensed liquid storage compounds for the flowable ion-storing redox compositions, systems that utilize various working ions are contemplated, including aqueous systems in which $H^+$ or $OH^-$ are the working ions, nonaqueous systems in which $Li^+$, $Na^+$, or other alkali ions are the working ions, even alkaline earth working ions such as $Ca^{2+}$ and $Mg^{2+}$, or $Al^{3+}$. In each of these instances, a negative electrode storage material and a positive electrode storage material may be required, the negative electrode storing the working ion of interest at a lower absolute electrical potential than the positive electrode. The cell voltage can be determined approximately by the difference in ion-storage potentials of the two ion-storage electrode materials.

In some embodiments the "stack" or electricity generating portion of the battery is reversibly coupled to vessels or containers holding the cathode slurry and anode slurry. The power system is illustrated in FIG. 1. The power system includes an energy stack 100 that contain electrodes and chambers for flowing the anode slurry and cathode slurry. The anode slurry is pumped from vessel 120 by a pump (not shown) through an entry conduit 130 into the energy stack. The conduit 130 and vessel 120 and are fitted with quick disconnect fittings 140 that permit the release and connection of the vessel to the power system. Similarly, the cathode slurry is pumped from a vessel 150 by pump (not shown) through an entry conduit 160 into the energy stack. The conduit 160 and vessel 150 and are fitted with quick disconnect fittings 170 that permit the release and connection of the vessel to the power system. The consumed or 'spent' anode slurry and cathode slurry is removed from the stack using exit conduits 135 and 165, respectively. Exit conduits are also fitted with quick release fittings (not shown). Energy stack 100 may optionally have a quick disconnect fitting 155, 155 as well. Thus, the vessel or fuel container is removable from the system and may be easily replace or refilled when the anode slurry or cathode slurry is consumed or 'spent.' In some embodiments, redox composition fluid is circulated constantly through the flow cell while being slightly charged and discharged with each pass.

The conduit can be rigid or flexible and can be prepared from conventional materials capable of withstanding a range of temperature conditions and which are chemically stable in contact with the slurries. Exemplary materials include metals such as copper or brass or stainless steel, elastomers, polyolefins, and fluoropolymers such as Teflon J. The fittings may be any conventional fitting used to connect and disconnect tubing or piping, selected to provide a hermetic seal and to be chemically stable in contact with the slurries of the invention. Exemplary fittings include those commonly referred to as quick disconnect hose fittings or hydraulic quick disconnect couplers.

Figure 2:
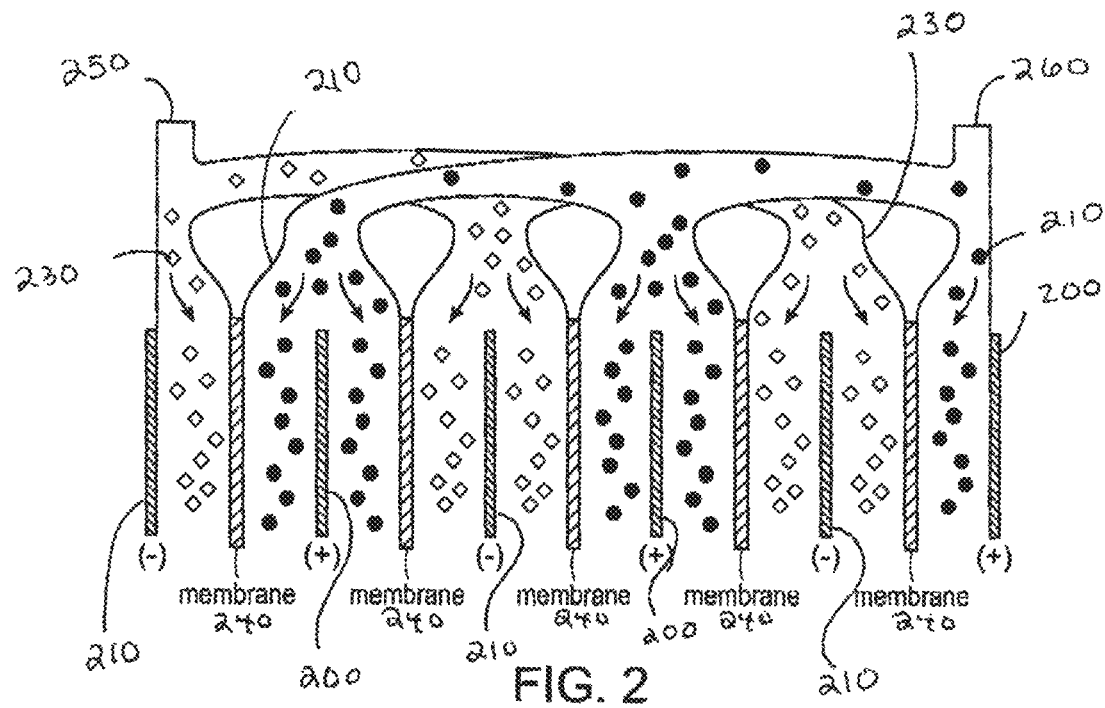
FIG. 2 is a cross-sectional illustration of an energy stack according to one or more embodiments, showing the introduction of anode slurry and cathode slurry into the stack.

FIG. 2 is a cross-sectional view of an interior portion of the energy stack illustrating the intake manifolds for the anode slurry and cathode slurry. The energy stack includes a plurality of cells, each containing a positive electrode 200 in contact with cathode slurry 210, a negative electrode 220 in contact with anode slurry 230, and iconically conductive membrane 240 separating the anode slurry from the cathode slurry. In one or more embodiments, the electrodes are in contact with the respective anode and cathode slurries on both faces of the electrode. Thus, the cells can be efficiently arranged in facing arrangement as is known in the art for solid batteries. Each cell includes an anode slurry inlet 250 to permit inflow of anode slurry and a cathode slurry inlet 260 to permit flow of cathode slurry. The anode slurry inlets may be part of a manifold having a single inlet source 270 from anode slurry vessel 120. The cathode slurry inlets may be part of a manifold having a single inlet source 280 from anode slurry vessel 120. The flow divide can occur inside or outside of the energy stack.

The energy stack can be arranged to provide a plurality of electrochemical cells that are electrically connected in parallel or in series to provide a power system having a desired set of properties. Battery packs get their desired operating voltage by connecting several cells in series. For example, electrochemical cells that are connected in series will result in a cell in which the overall voltage of the system is the sum of the individual cell voltages. If higher capacity and current handling is required, the cells are connected in parallel. Some packs have a combination of serial and parallel connections.

Figure 3:
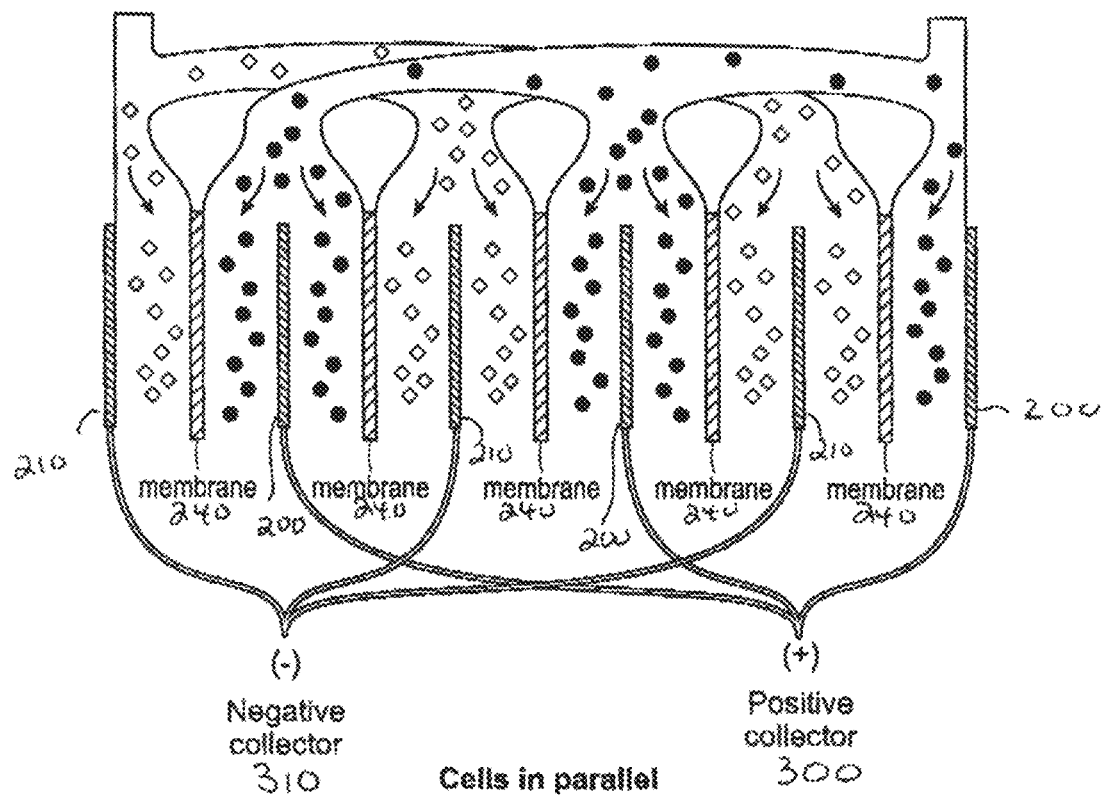
FIG. 3 is a cross-sectional illustration of an energy stack having cells electrically connected in parallel according to one or more embodiments.

FIG. 3 is a cross-sectional view of an electrical stack in which the cells of the stack are electrically connected in parallel. The stack including a plurality of positive current collectors 200 are joined at a positive terminal 300. Likewise, the plurality of negative current collectors 220 are joined at negative terminal 310. Individual energy stacks can be further connected, either in series or in parallel to provide the desired battery performance.

Figure 4:
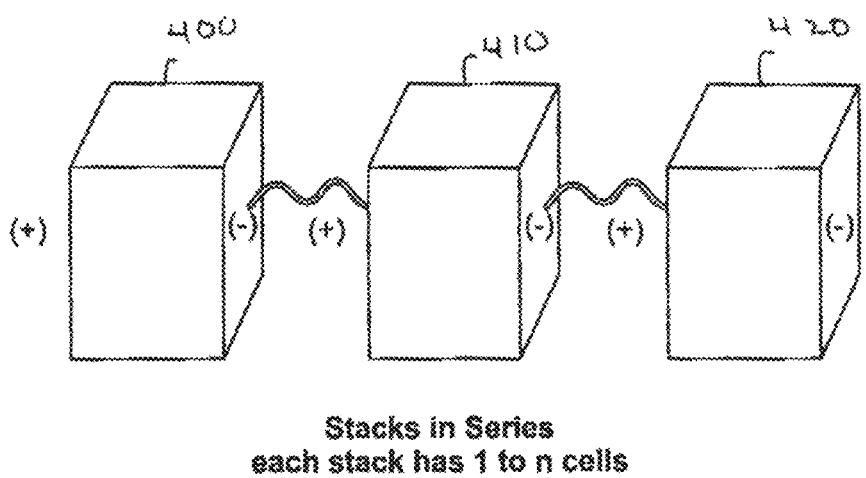
FIG. 4 is a cross-sectional illustration of a plurality of energy stacks that are electrically connected in series according to one or more embodiments.

FIG. 4 is a perspective view of a plurality of energy stacks 400, 410, 420 that are joined in series. The individual cells of the energy stack may be joined in series or parallel. The power system can include any number of individual energy stacks to provide the desired voltage.

In operation, each of the energy stacks has a manifold to distribute the input cathode slurry and anode slurry to the individual cells as shown in FIGS. 2 and 3. If a number of stacks are present, there would be a main cathode slurry flow line that goes to the cathode input on each of the stacks. A main anode slurry flow line can be used similarly with the anode slurry.

Figure 10:
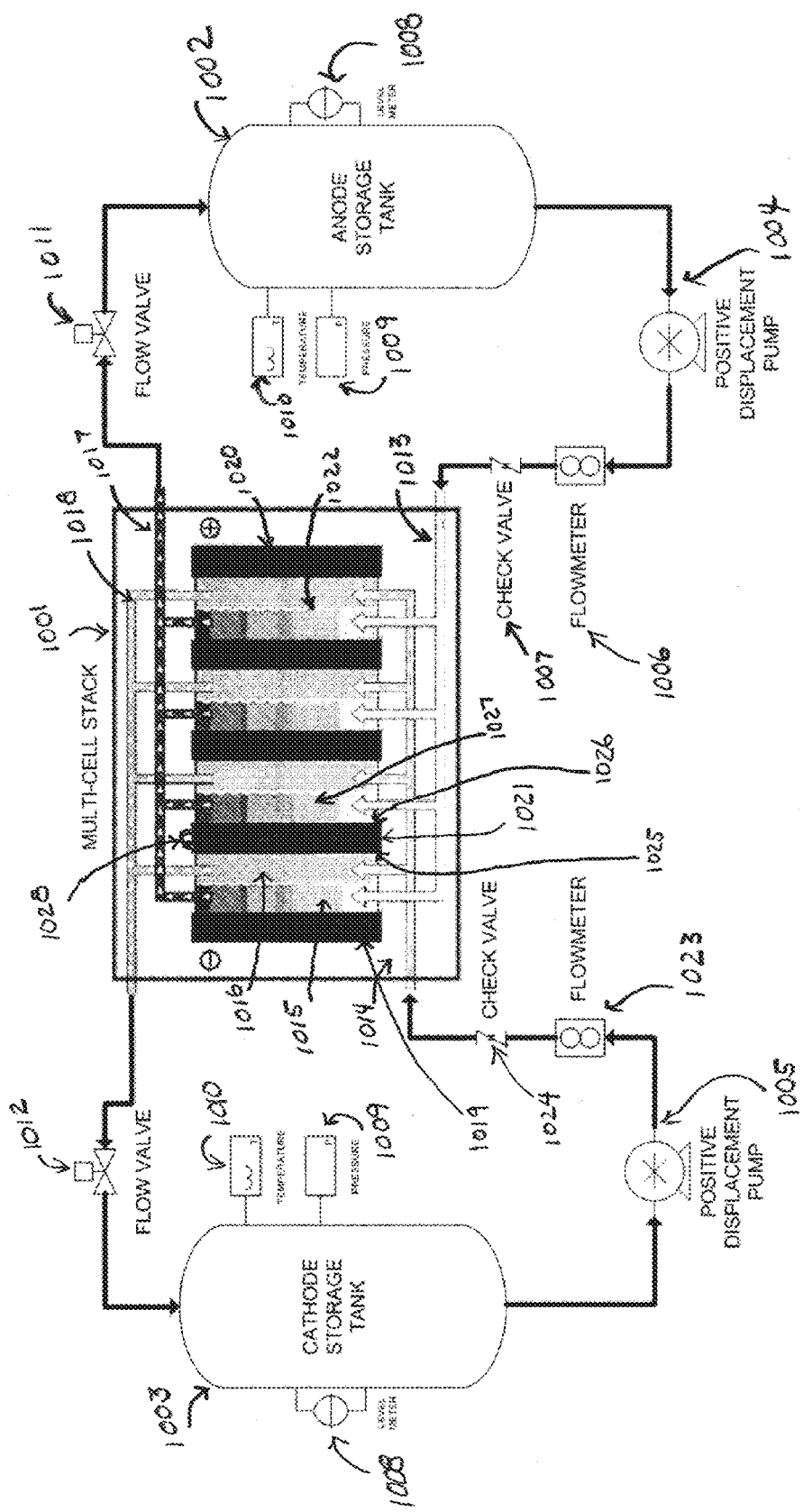
FIG. 10 illustrates a multi-redox flow cell stack device according to one or more embodiments.

According to one or more embodiments, the flow cell stack is intergrated into an energy system. FIG. 10 illustrates a multi-redox flow cell stack device 1001. As shown in FIG. 10, the multi-cell stack device includes end electrodes 1019 (anode) and 1020 (cathode) at the end of the device, as well as one or more bipolar electrodes such as 1021. Between the electrodes, the multi-cell stack device also includes anode slurry compartments such as 1015 and cathode slurry compartments such as 1016. The two compartments are separated by ionically conductive membranes such as 1022. This arrangement is repeated to include multi-cell design in the device. As least one of the anode slurry and cathode slurry in the anode slurry and cathode slurry compartments contain semi-solid or condensed liquid as described above. Bipolar electrode 1021 includes a cathode (cathode current collector) 1025 which faces the cathode slurry cell compartment 1016 and an anode (anode current collector) 1026 which faces the anode slurry cell compartment 1027. A heat sink or a insulator layer 1028 is disposed in between cathode 1025 and anode 1026. In some embodiments, the heat sink comprises a coolant. The electrode arrangement described here in FIG. 10 is different from that in FIG. 2 and represent an alternative design of the multi-redox flow cell stack, i.e., individual cells instead of face to face cells.

The current collector (electrode) is electronically conductive and should be electrochemically inactive under the operation conditions of the cell. Typical current collectors for lithium redox flow cells include copper, aluminum, or titanium for the negative current collector and aluminum for the positive current collector, in the form of sheets or mesh, or any configuration for which the current collector may be distributed in the electrolyte and permit fluid flow. Selection of current collector materials is well-known to those skilled in the art. In some embodiments, aluminum is used as the current collector for positive electrode. In some embodiments, copper is used as the current collector for negative electrode.

The membrane can be any conventional membrane that is capable of ion transport. In one or more embodiments, the membrane is a liquid-impermeable membrane that permits the transport of ions therethrough, namely a solid or gel ionic conductor. In other embodiments the membrane is a porous polymer membrane infused with a liquid electrolyte that allows for the shuttling of ions between the anode and cathode electroactive materials, while preventing the transfer of electrons. In some embodiments, the membrane is a microporous membrane that prevents particles forming the positive and negative electrode flowable compositions from crossing the membrane. Exemplary membrane materials include polyethyleneoxide (PEO) polymer in which a lithium salt is complexed to provide lithium conductivity, or Nafion™ membranes which are proton conductors. For example, PEO based electrolytes can be used as the membrane, which is pinhole-free and a solid ionic conductor, optionally stabilized with other membranes such as glass fiber separators as supporting layers. PEO can also be used as a slurry stabilizer, dispersant, etc. in the positive or negative flowable redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

In some embodiments, a bipolar electrode includes a cathode and an anode separated by a coolant region for introducing a coolant through the bipolar electrode. Non-limiting examples of coolants include ethylene glycol and water.

The multi-cell stack device is connected to an anode slurry storage tank 1002 which stores the anode slurry. As shown in FIG. 10, a positive displacement pump 1004 is used to pump anode slurry through a flow meter 1006 and a check valve 1007 into a manifold 1013, which delivers the anode slurry into multiple anode slurry cell compartments such as 1015. The discharged anode slurry is removed through manifold 1017, flow valve 1011 and back into the tank 1002. Similarly, a positive displacement pump 1005 is used to pump cathode slurry from storage tank 1003, through a flow meter 1023 and a check valve 1024 into a manifold 1014, which delivers the cathode slurry into cathode slurry cell compartments such as 1016. The discharged cathode slurry is removed through manifold 1018, flow valve 1012 and back into the tank 1003.

A positive displacement pump causes a fluid to move by trapping a fixed amount of it then forcing (displacing) that trapped volume through the pump. Positive displacement pump 1004 or 1005 can minimize the loss of the fluid through the pump, and any positive displacement pump known in the art can be used. In addition, other means of fluid transport can be used. Flow meter 1006 or 1023 measures and controls the amount of anode slurry or cathode slurry that is pumped into the cell compartments. Any type of flow meter known in the art can be used. Non-limiting examples of flow meters include electric flow meters, turbine flow meters, mass flow meters and positive displacement flow meters. Check valves 1007 and 1024 are used to prevent the back flow of the fluids. Any check valves known in the art can be used. Non-limiting examples of flow valves 1011 and 1012 include any mechanical or electrical valves. Flow valves are further discussed in greater details in FIG. 13. Optionally, a level meter 1008 can be connected to the storage tank 1002 or 1003 to monitor the levels of the cathode slurry or anode slurry inside the tank. Temperature monitors 1010 and pressure monitors 1009 can also be connected to the storage tank to monitor the temperature and pressure within the tank.

Figure 11:
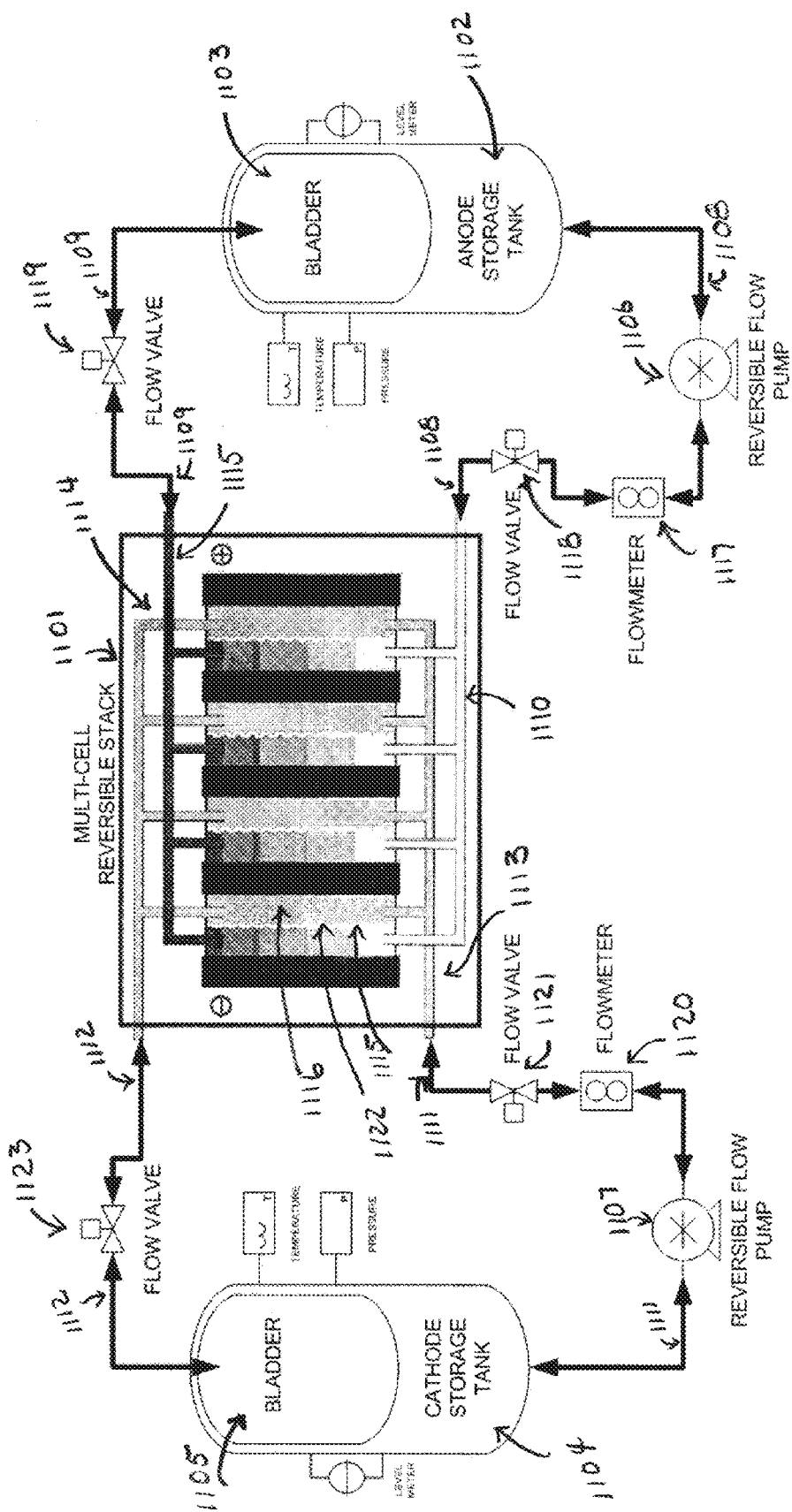
FIG. 11 illustrates a multi-redox flow cell stack where the flow directions of the cathode slurry and anode slurry are reversible according to one or more embodiments.

FIG. 11 illustrates a multi-redox flow cell stack device 1101 where the flow directions of the cathode slurry and anode slurry are reversible. The reversible nature of the pumps allows the discharge and recharge of the electroactive slurry to take place in situ. The multi-cell stack device also includes anode slurry compartments such as 1115 and cathode slurry compartments such as 1116. The two compartments are separated by ionically conductive membranes such as 1122. As least one of the anode slurry and cathode slurry in the anode slurry and cathode slurry compartments contain semi-solid or condensed liquid as described above.

As shown in FIG. 11, the multi-redox flow cell 1101 is connected to anode slurry storage tank 1102 and cathode slurry storage tank 1104. Anode slurry storage tank 1102 further contains a bladder 1103. During operation (discharge of the device), the charged anode slurry in storage tank 1102 is pumped, in the direction as indicated by arrow 1108, by using a reversible flow pump 1106. The anode slurry passes flow meter 1117, flow valve 1118 and into the manifold 1110. The manifold 1110 delivers charged anode slurry into anode slurry cell compartments such as 1115. After use, the discharged anode slurry can be removed through manifold 1115 and pumped through valve 1119 into bladder 1103 for storage. During charging of the device, the flow direction within the reversible flow pump 1106 is reversed and the discharged anode slurry in bladder 1103 can be pumped, in the direction as indicated by arrow 1109, through valve 1119 and into manifold 1115, which delivers the discharged anode slurry into the anode slurry compartments such as 1115. A voltage is then applied to the device and the discharged anode slurry can be recharged.

Similarly, cathode slurry storage tank 1104 further contains a bladder 1105. During operation (discharge of the device), the charged cathode slurry in storage tank 1104 is pumped, in the direction as indicated by arrow 1111, by using a reversible flow pump 1107. The cathode slurry passes flow meter 1120, flow valve 1121 and into the manifold 1113. The manifold 1113 delivers charged cathode slurry into cathode slurry cell compartments such as 1116. After use, the discharged cathode slurry can be removed through manifold 1114 and pumped through valve 1123 into bladder 11105 for storage. During charging of the device, the flow direction within the reversible flow pump 1107 is reversed and the discharged cathode slurry in bladder 1105 can be pumped, in the direction as indicated by arrow 1112, through valve 1123 and into manifold 1114, which delivers the discharged cathode slurry into the cathode slurry compartments such as 1116. A voltage is then applied to the device and the discharged cathode slurry can be recharged. The flow valves and flow meters are as described above.

The semi-solid or condensed liquid anode slurry or cathode slurry as described above are electrically conductive materials. Thus, during operation of the device, shunt current may occur to bypass one or more cell compartments and/or bipolar electrodes in the device. For example, the current can go through the cathode slurry or anode slurry in the manifold to bypass one or more cell compartments and/or bipolar electrodes in the device. When a bipolar stack comprising multiple individual cells is used, the occurrence of shunt current from cathode to cathode and anode to anode will decrease the stack voltage. In one or more embodiments, non-conductive valves can be introduced at the inlet or outlet position of the manifold to reduce or prevent the shunt current.

Figure 12:
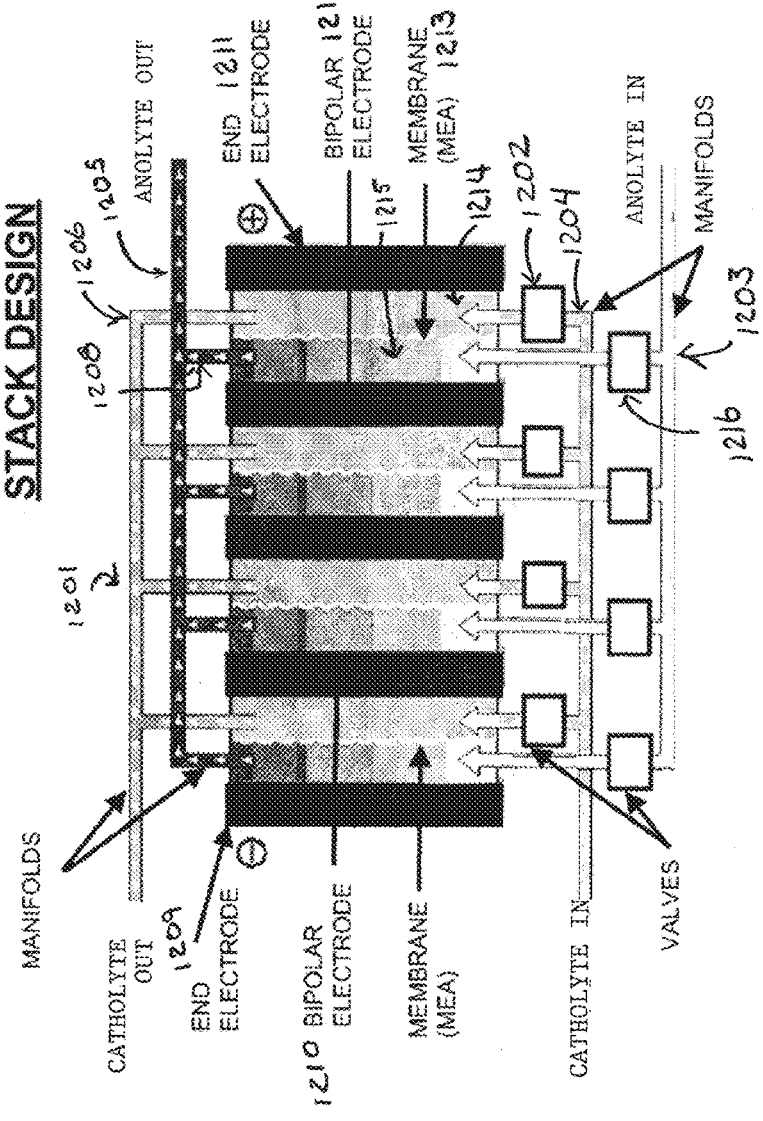
FIGS. 12A-12E illustrate a multi-cell semi-solid flow cell stack design and various types of valves that can be incorporated into the design according to one or more embodiments.

FIG. 12 illustrates a multi-cell semi-solid flow cell stack design and various types of valves that can be incorporated into the design. FIG. 12A illustrates a multi-cell semi-solid flow cell stack design 1201 which includes end-electrodes 1209 and 1211, bipolar electrodes such as 1210 and 1212, membranes such as 1213 which separates anode slurry cell compartment 1215 and cathode slurry cell compartment 1214. Valves such as 1202 are positioned at one of the inlet positions of the manifold 1204, which delivers cathode slurry into the cathode slurry cell compartment 1214. Valves such as 1216 are positioned at one of the inlet positions of the manifold 1203, which delivers anode slurry into the anode slurry cell compartment 1215. Valves such as 1202 and 1216 are non-conductive thus can prevent the shunt current through the manifold. In one or more embodiments, such valves are pulsating valves and open for only a short period of time to allow the anode slurry or cathode slurry to pass through quickly without resulting in any shunt current. In one or more embodiments, additional valves are positioned at the outlet position 1207 of manifold 1206 and at the outlet position 1208 of manifold 1205.

The valves described above are any mechanical or electrical operated valves. In some embodiments, the valve is a solenoid valve. Non-limiting examples of suitable non-conductive valves are illustrated in FIGS. 12B-12E. FIG. 12B illustrates the open and close forms of a valve including a ball-like switch. The valve is activated by pressure differentiation of the two side of the valves. FIG. 12C illustrates the open and close forms of a valve including a coin-like switch. The valve is activated by pressure differentiation of the two side of the valves. FIG. 12D illustrates the open and close forms of a valve including a flapper-like switch. The valve can be activated by a spring mechanism to allow the fluid flow. The valve can also by activated by a double-spring mechanism to reverse the direct of the flow. Such spring mechanism can be controlled mechanically or electrically. Different types of heart mechanical valves can also used FIG. 12E illustrates the open and close forms of a valve including a membrane switch. The membrane is made out of "shape memory membrane material" which changes its shape when activated. The membrane-switch can be activated electrically. Other examples include tissue valves which can be electrically activated. Other valves known in the art are also contemplated.

Figure 13:
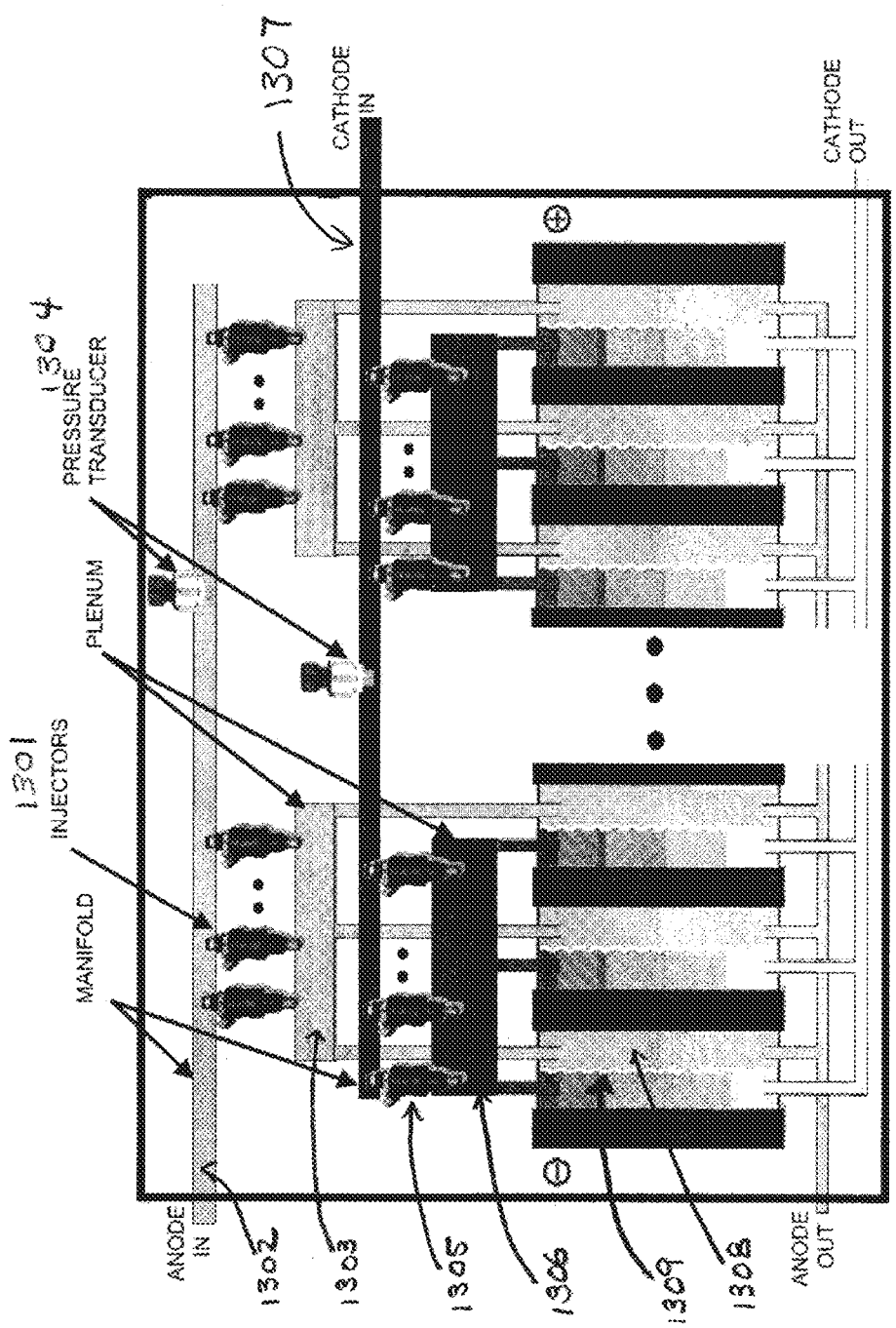
FIG. 13 illustrates a multi-port injection system for semi-solid flow multi-cell stack according to one or more embodiments.

FIG. 13 illustrates a multi-port injection system for semi-solid flow multi-cell stack. A multi port injection system can precisely control the amount of fluid being delivered to each "plenum" or cell compartment. If a group of cells need more fluid to increase the voltage a multi-port injection will be able to accomplish this without affecting the other compartments. Increase fluid flow accuracy and controls. As shown in FIG. 13, the multi-flow cell design includes injectors such as 1301 (in manifold 1302) and 1305 (in manifold 1307). During operation, the anode slurry is introduced into manifold 1302 and injected into plenum region 1303 by injectors such as 1301. The plenum region 1303 is pressurized so that the anode slurry, once injected into anode slurry cell compartment 1308, will not back-flow into the manifold 1303. Similarly, the cathode slurry is introduced into manifold 1307 and injected into plenum region 1306 by injectors such as 1305. The plenum region 1306 is pressurized so that the cathode slurry, once injected into cathode slurry cell compartment 1309, will not back-flow into the manifold 1307. Because the flow direction is controlled, the shunt current through the manifold is also minimized. Such configuration can reduce or minimize the shunt current between fluids in different "plenums". Pressure transducers such as 1304 are included in the manifold to monitor and control the pressure within the manifold.

In one or more embodiments, the inside of the manifold used to deliver cathode and anode slurries and, optionally, coolant, is coated with non-conductive materials to minimize shunt current across the fluids. In one or more embodiments, the manifold itself is made of an electrically insulating material such as a polymer or ceramic.

Figure 14:
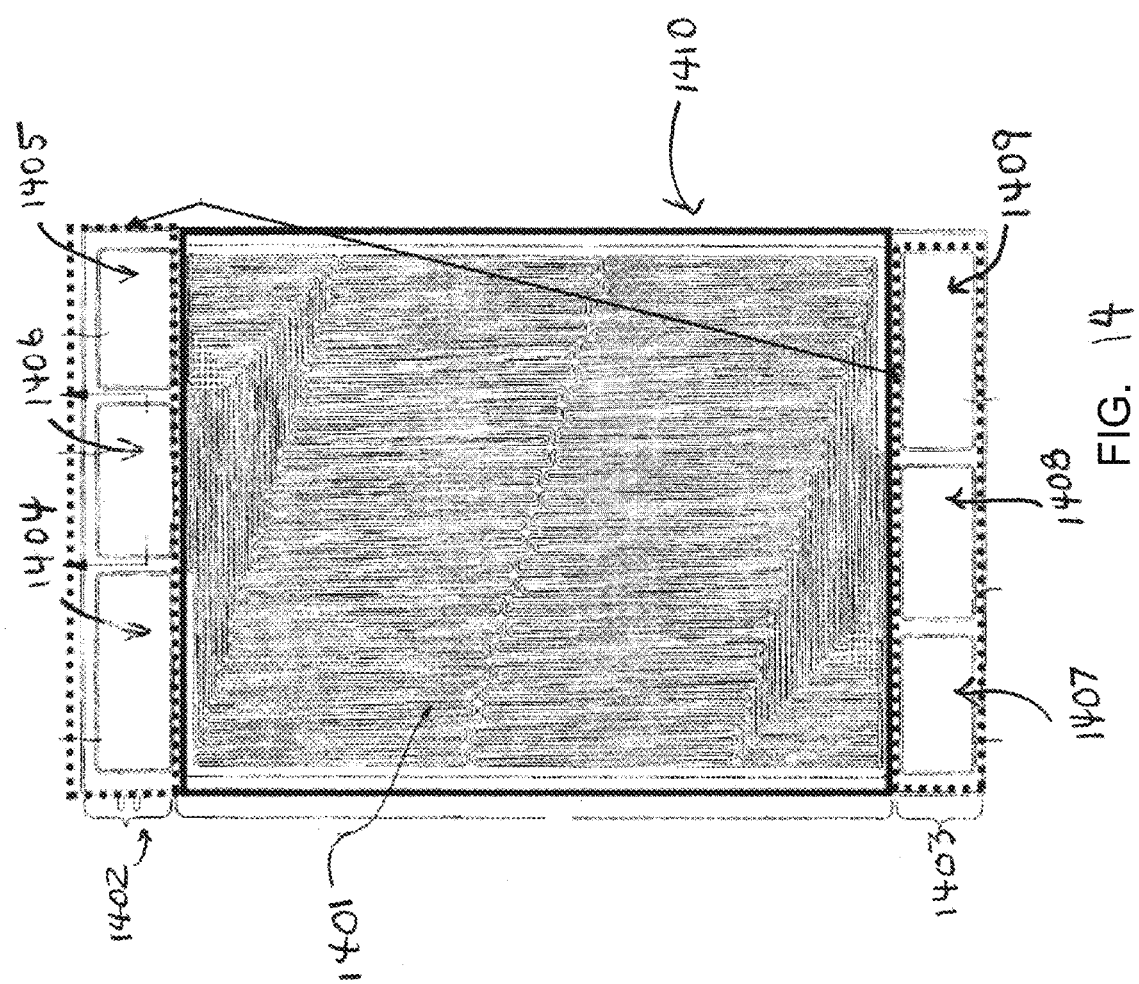
FIG. 14 illustrates a plan view of one of bipolar plates of a multi-redox flow cell stack design assembled by stacked plates according to one or more embodiments.
Figure 15:
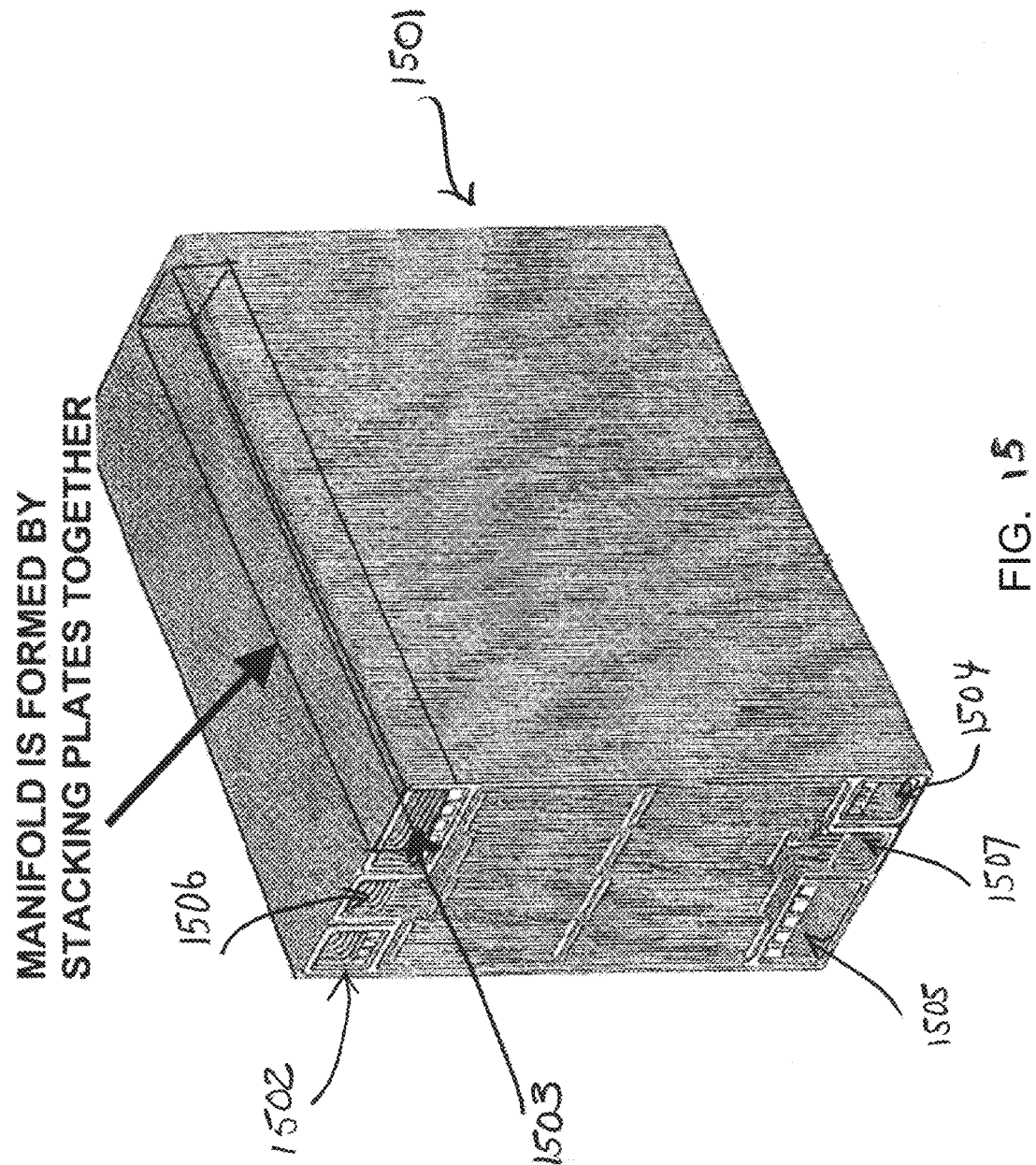
FIG. 15 illustrates a semi-solid flow multi-cell stack design where the manifold is formed by stacking the plates together according to one or more embodiments.

FIG. 14 illustrates a plan view of one of bipolar plates of a multi-redox flow cell stack design assembled by stacked plates such as described above with reference to FIG. 10. As shown in FIG. 14, the plate includes an active region 1401 which comprises a cathode current collector or an anode current collector. Region 1402 includes opening 1404 which is used as part of the manifold to deliver anode slurry into the anode slurry cell compartment. Region 1402 also includes opening 1405 which is used as part of the manifold to deliver cathode slurry into the cathode slurry cell compartment. Region 1402 also optionally includes opening 1406 which is used as part of a manifold to deliver coolant into the bipolar electrode. Region 1403 includes opening 1407 which is used as part of the manifold to remove cathode slurry from the cathode slurry cell compartment. Region 1403 includes opening 1409 which is used as part of the manifold to remove discharged anode slurry from the anode slurry cell compartment. Region 1403 also optionally includes opening 1408 which is used as part of a manifold to remove coolant from the bipolar electrode. Optionally, a channel (not shown) disposed between the two electrodes of the bipolar electrode is used to hold the coolant and is connected with openings 1406 and 1408. The plates which comprise cell compartments and membranes between the electrodes also comprises similar openings as those described in FIG. 14. The bipolar plates such as 1410 and end electrode plates as described are aligned together, stacked with cell compartments and membranes in between and form a semi-solid flow multi-cell stack 1501 as illustrated in FIG. 15, with all the corresponding openings of different plates properly aligned. Manifold 1502 is formed by stacking the plates together and aligning similar openings on each plate accordingly. Manifold 1502 is used to introduce anode slurry into the anode slurry cell compartment. Similarly, manifold 1503 is formed to introduce cathode slurry into the cathode slurry cell compartment. Manifolds 1505 and 1504 are also formed to remove anode slurrys and cathode slurry from the cell compartments, respectively. Optionally, channels or manifolds such as 1506 and 1507 are also formed, which are used for introducing and removing the coolant from the device, respectively. The inside of the openings 1405, 1406, 1407, 1408, 1409, and 1410 can be coated with non-conductive materials. Thus, the manifolds formed for anode slurry, cathode slurry, and optionally coolant all have non-conductive inside thus minimized unwanted, parasitic shunt currents to flow through anode slurry, cathode slurry, and the coolant. Any non-conductive coating known in the art can be used. Non-limiting examples of the non-conductive coatings include non-conductive polymers such as epoxies, polyamide-imides, polyether imides, polyphenols, fluro-elastomers, polyesters, phenoxyphenolics, epoxidephenolics, acrylics and urethanes.

With reference to FIG. 5, a feature of the power system using redox flow cells as the energy and power source is that the anode slurry and cathode slurry can be introduced into the energy stack at a high state of charge, that is the electroactive components of the system is fully charged. During operation, anode slurry and cathode slurry flow, e.g., are pumped, into the energy stack 500 from fuel storage vessels 510 and 520, respectively, and into individual cells and flow past current collectors. The redox-active ions or ion complexes undergo oxidation or reduction when they are in close proximity to or in contact with a conductive electrode or current collector that typically does not itself undergo redox activity. During these reactions, the redox-active materials discharge, e.g., the state of charge diminishes. As the anode slurry and cathode slurry exit the energy stack, the state of charge is reduced and the anode slurry and cathode slurry are 'spent.' The spent suspensions are then collected in spent fuel storage vessels 530 and 540, respectively. When the fuels cells 510 and 520 are empty, and spent fuel tank 530 and 540 are full, they can be swapped out and replaced with fresh containers of fuel and empty spent fuel containers. In this manner, the device being powered by the power system, e.g., an electric or hybrid electric motor vehicle, is refueled.

In some embodiments, the fuel containers are adapted to both deliver the fresh fuel and accept the spent fuel, as shown in FIG. 6A. FIG. 6A is a perspective view of tank 600 that can be used for delivering either anode slurry or cathode slurry to the energy stack, and receiving the spent fuel. Tank 600 includes an upper chamber 610 and a lower chamber 620. The upper chamber is in flow communication with the intake manifold of the cathode slurry or anode slurry through conduit 615. Once the fuel has been consumed in the energy stack, it exits the stack and returns to the lower chamber 620 through conduit 625. Tank 600 includes a moveable inner wall or membrane 628 that can move up and down in the tank interior to increase or decrease the size of the two interior chamber to adjust for the constantly changing relative volume of liquid in the two chambers. In some embodiments the membrane is selected to be flexible over the temperature range of use, sufficiently strong to withstand the forces and pressures encountered in use, chemically stable in contact with the components of the cathode and anode slurries, and impermeable or permeable to the electrolyte.

In still yet another embodiment, a single tank 700 is used for the out flow and uptake of both anode slurry and cathode slurry. In FIG. 6B, tank 700 includes upper chambers 710 and 720 for housing fresh anode slurry and cathode slurry, respectively. The tank also includes lower chambers 750 and 760 for receiving spend anode slurry and cathode slurry, respectively. As in die single fuel canisters described in FIG. 6A, the tank can include a moveable membrane or wall 730, 740 that moves in response to the relative change in volume of fresh and spent fuels. The two membranes can move together or independently. In use, the fresh anode slurry is fed into the energy stack from conduit 765 similarly, the fresh cathode slurry is fed into the energy stack from conduit 775. After use, the spent anode slurry and cathode slurry return to tank 700 through conduits 785 and 795, respectively. Wall 715 separates the anode slurry from the cathode slurry and may be stationary or moveable.

The particular type of tank used may depend on the intended use of the power system. For systems with adequate storage room in the engine, the four tank system described in FIG. 5 can be used and may be most appropriate for providing large volume of fuel, which permits longer distances before refueling. On the other hand, the one tank, four compartment tank described in FIG. 6B is compact and occupies less spaced. It can easily be swapped out in a single step. The tank, with its additional elements and moving parts, is more expensive to make and use.

Another feature of the redox composition is the availability of various "grades" of "fuel" or slurry. For example, a premium grade of fuel may include a cathode slurry or anode slurry or both that provides higher power, or longer operational time and therefore driving range, or both, in the same volume of "fuel." Compared to an internal combustion engine powered vehicle, where the differences in power between "regular" and "premium" gasoline are often not detectable or are very subtly different to the consumer, the differences in power and range provided by properly engineered slurries can be very dramatic—the power may be 10% or 20% or 50% or even 100% greater for one slurry than another, as may be the driving range, for the same size "gas tank."

Figures 7A, 7B, 7C:
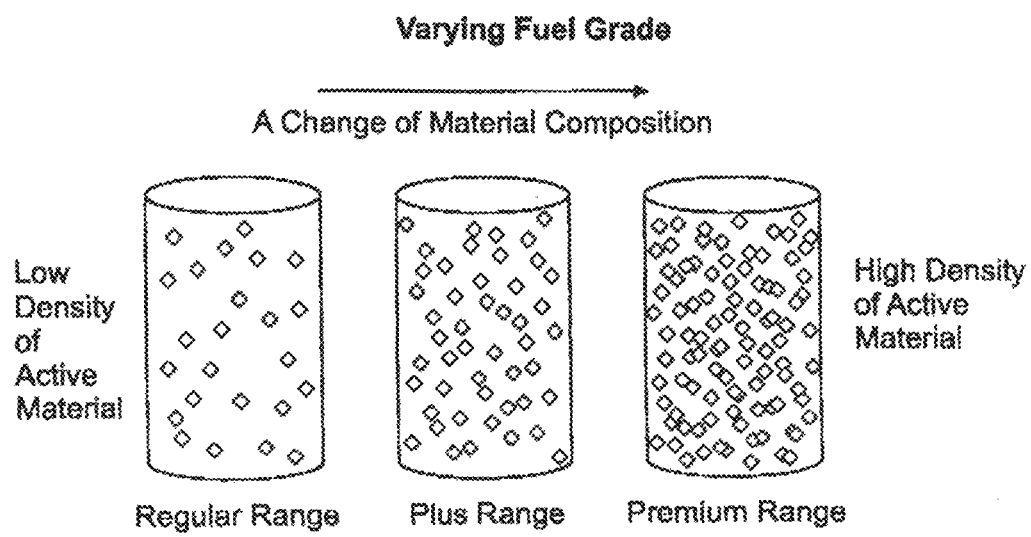
FIGS. 7A-C are illustrations of a fuel tank containing an anode or cathode slurry of different grades according to one or more embodiments.

Thus, one use model of the invention is to provide, within the same volume or size of "fuel tank" or total system size including stacks, widely varying performance capabilities. FIG. 7 illustrates varying fuel grade in tanks of the same size. The fuel can range from a low grade fuel having a low fuel mileage range (7A) to a medium "plus" grade fuel having a medium mileage range (7B) and even can include a "premium" grade of higher grade fuel that provides the best mileage range (7C). The grades of fuel can be adjusted by changing a number of variables in the cathode and anode slurries. For example, the number or density of electrode particles in a slurry can be adjusted in order to adjust the charge capacity per unit volume of slurry, with higher particle density having greater charge capacity and longer driving range. This is illustrated in FIGS. 7A-7C, which illustrates fuel tanks of the same size having an increased density of particles with increasing fuel grade. By way of example, a lithium iron phosphate or lithium cobalt oxide based fuel system can be prepared at particle densities that provide a total volume percentage of the active material in the slurry ranging from about 20 volume % to about 70 volume %. The additional particle density is typically accompanied by a change in viscosity or rheology of the slurries, which may necessitate a change in the pumping procedure such as pumping rate or intermittency of pumping. In yet other embodiments, the range of regular, plus and premium ranges of fuel can be obtained by using different electroactive materials having different charge capacities.

Figures 8A, 8B, 8C:
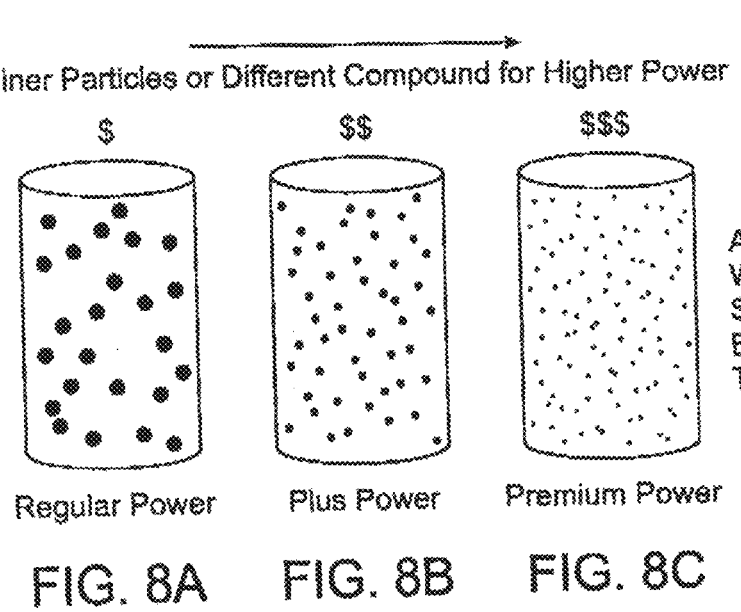
FIGS. 8A-C are illustrations of a fuel tank containing an anode or cathode slurry of different power grades according to one or more embodiments.

In yet another embodiment, the power of the fuel is modified and the consumer may select between regular, plus power and premium power batteries. In FIG. 8, fuel grades based on power is illustrated. The power system may be able to operate using anode and cathode slurries having different power, e.g., the delivery of larger or smaller amounts of energy per unit time. The power of the anode or cathode slurries can be varied by modifying the particle size of the electroactive particles in the slurry. A smaller particle size would have a greater surface area and therefore a greater amount of working surface available per unit mass, as well as a smaller dimension through which the solid-state transport of lithium takes place, thereby providing higher discharge power. Thus, by way of example, a lithium iron phosphate based cathode may be prepared in average crystallite sizes of 30 nm, 50 nm, and 100 nm, and a corresponding graphite based anode slurries may contain particle sizes of 1 micrometer, 5 micrometers, and 20 micrometers. The crystallite size is not necessarily the same as the particle size since particles may consist of agglomerates or aggregates of individual crystallites. In other embodiments, the electroactive materials of the slurries may be varied to provide different power capabilities in the different fuel systems.

Another use model is to provide to the consumer various tank sizes. Unlike a conventional vehicle in which the size of the fuel tank is determined at time of manufacturing, in the present invention the ability to readily exchange slurry tanks for refueling, one can provide tanks of different sizes for different needs. For example, a consumer may purchase a larger tank of fuel, and give up some storage space in a car, when taking a longer trip.

Figure 9A:
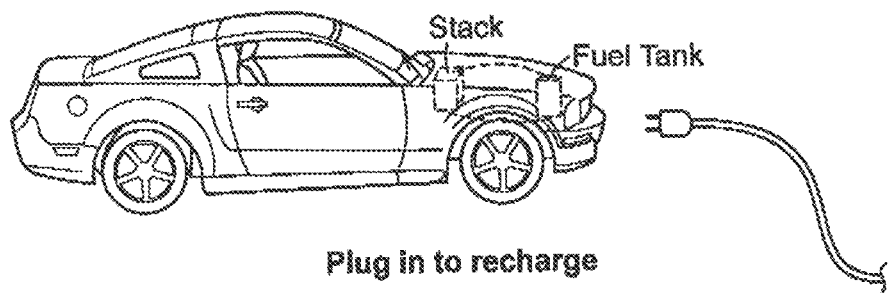
FIGS. 9A-9B illustrate the recharging and replacement of the anode and cathode slurry fuel tanks according to several embodiments.
Figure 9B:
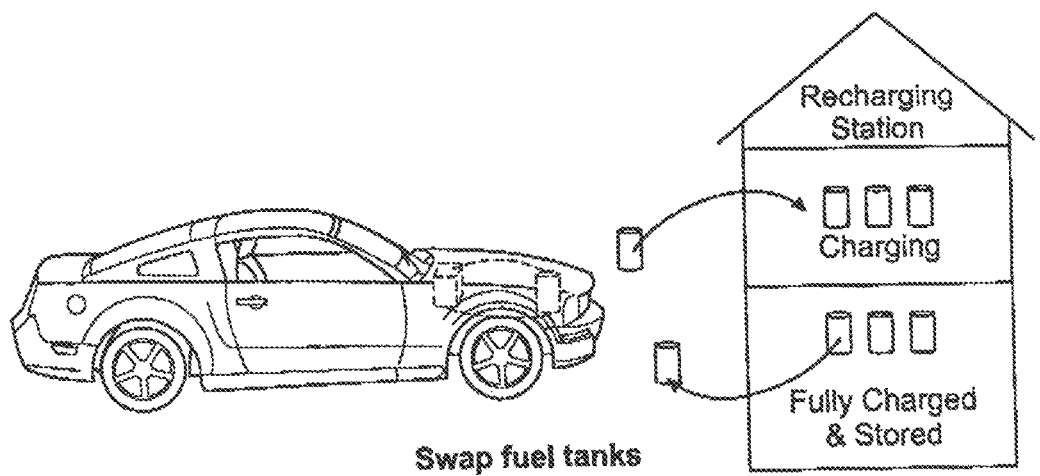

The ability to conveniently exchange the fuel tanks provides several options for recharging, as illustrated in FIG. 9A-9B. The spent cathode and anode slurries typically contain electroactive materials developed for standard secondary batteries and may be recharged under conditions that are similar to those developed for those materials in standard secondary battery formats. Thus, a consumer may recharge the spent anode and cathode slurries while the fuels are hooked up to the power system, by plugging the power system into an alternative power source, e.g., a wall outlet, and initiating a recharging cycle in the power system. The two slurries are pumped in the reverse direction while charging, and are stored, presumably in the original tanks. No other components need to be added as long as the pumps/valves work in both directions. In other embodiments, one can have a separate slurry flow circuit to bring the slurries back through the stack during charging, if there is a need to use one-way valves.

In other embodiments, for example, when traveling or short on time, the user can swap fuel tanks at a recharging station. The user returns spent fuels at a recharging station and receives fresh slurries. The charging station can replace the fuel tanks (like the model used for refilling propane tanks) or simply empty and refill the existing tanks. The ability to swap fuel tanks would provide flexibility in the type of fuel and fuel capacity available to the user, as discussed above. The user can change grade, power or tank capacity from refill to refill.

In conventional batteries the cathode/anode ratio is fixed at the time of manufacturing and cannot be changed if the operating conditions of the battery require it, such as if at high power one of the electrodes has slower kinetics and therefore more of that electrode would be advantageous. In a power system as described herein, the properties of the power system can be varied or altered as needed.

In one or more embodiments, the flow rates of the cathode and anode slurries can be different. For example, a lithium phosphate-based cathode suspension used with a graphite anode suspension may be rate-limited by the lithium uptake capability of the anode because too fast a charge rate may result in Li plating at the anode. However, by flowing the anode slurry at a higher rate than the cathode slurry under such high power charge conditions, the plating can be avoided. Also, the voltage of the cell will remain higher because anode slurry will exit the stack at a higher state of charge.

In another embodiment, the flow rates of the cathode and anode slurries, or Cathode/Anode ratio in-situ, can be varied to accommodate any degradation of the electrode slurries that occurred during use. Rather than simply replacing or discarding the slurry, it may be used at a different flow rate to improve the performance of the cell, for example, keeping performance within specifications, even if lower than with new slurries. That is, the operating life of the cell can be improved and extended by increasing the flow rate of one or both slurries, or by changing the Cathode/Anode ratio up or down.

Another operational mode that is advantageous in the redox composition is that power can be improved when needed. In one or more embodiments, the cell voltage is maintained at a relatively higher level by increasing the flow rate of both slurries, so that each is operating at a high state of charge during periods of higher power demand. The energy available in the slurries may not be fully utilized during such operational periods, but the power can be improved. Of course, this can be accomplished by increasing the flow rate of just one electrode slurry as well to keep that slurry at higher rate.

In one or more embodiments, the stack includes monitoring devices that provide the power system or a power management system with information concerning the condition of the power system. This information may be used, in real time or prior to use, to select the optimal operating conditions of the power system. By way of example, the temperature, flow rates, and relative amounts of the cathode and anode slurries can be controlled.

Another use model is to evaluate, replenish, or recondition the fuel slurries at a service provider or manufacturer at one or more times in the life of the fuel slurries. In a conventional battery, the electrodes cannot be reconditioned during the battery's life. In the redox power system, each slurry can be reconditioned to restore or extend the battery life. When a power system is first brought into the service station, the fuel may first be tested at the service provider to evaluate its condition when it is returned for charging or service. Secondly, it can be reconditioned in several ways. For example, residual water may be sequestered from the suspension. Additional salt to improve ion conductivity may be added. Solvents or electrolyte additives may be added. Additional solid phases including active materials used for ion storage, or conductive additives, may be added. The solid phases may be separated from the liquid electrolyte, for example by filtering centrifugation, or the addition of coagulation aids to cause the solid phases to be less well suspended. The solids or solid-enriched suspension and the separated liquid electrolyte may be individually treated, or even replaced.

Of course, any combination of replenishing or reconditioning steps may be performed as well. Doing so can decrease the expense of the system over its useful life by selectively replacing or reconditioning specific failed components, improve lifetime or performance as new additives or components are discovered, or aid in the recycling of the materials.

Another use model is to replace the power "stack" of the flow battery separately from the fuel tanks or other components. Unlike a conventional battery, the ability to replace only certain components as they degrade, or as upgrades are desired, provides economic advantages to both the user and the service provider or manufacturer. Thus, in one or more embodiments, the energy stack is removed from the power system and is replaced or repaired.

In another aspect, the power system can include an electrical energy storage device and power source that is simultaneously a conventional rechargeable battery and a flow cell in one integrated device. It is applicable to various battery chemistries, including aqueous batteries such as nickel metal hydride types, and nonaqueous batteries including lithium rechargeable batteries, sodium rechargeable batteries, or batteries based on other alkali or alkaline earth or non-alkaline working ions. Considering one embodiment based on lithium ion chemistry, the basic construction of such a cell has a separator, on one side of which is a lithium battery positive electrode or a negative electrode, or both, as in a conventional rechargeable lithium battery. That is, the electrodes comprise cathode or anode active material, and may comprise a coating of the active material on a metallic current collector, or may be a stand-alone electrode layer such as a densified or sintered layer comprising the active material, optionally with other constituents such as polymer binders or carbonaceous conductive additives or metallic additives or binders. These ion-storage electrodes will be referred to as the stationary electrodes. However, unlike a conventional lithium battery electrode, one or both of the stationary electrodes is permeable to a flow cell cathode slurry or anode slurry, so that during operation of the device, it is possible to charge or discharge only the active materials on the stationary electrode, only the flow cell cathode slurry or anode slurry, or both.

One embodiment of the invention uses a cathode slurry or anode slurry that is a semi-solid fluid, or suspension, or slurry, as described in previous filings.

In one embodiment, one or both of the stationary electrodes are immediately adjacent to the separator layer, including being coated on the separator. As in a conventional battery, this permits relatively rapid charge and discharge of the battery using the working ions stored in the stationary electrodes. In addition, the ions stored in the cathode slurry and anode slurry are also available to the device and can be charged and discharged, although this may occur at a different kinetic rate than the stationary electrodes. Such a design allows the single device to provide a high power charge or discharge for a relatively shorter period of time, while also having the high energy provided by the flow cell aspects of the design. Thus the stationary electrodes are situated between the separator and the flow cell reactants, and optionally may also serve as the current collectors for one or more of the flow cell reactants. Another advantage of such a design is that the stationary electrodes can provide mechanical support to the separator layer or reduce abrasion or wear of the separator when the cathode slurry and anode slurry are in the form of a semi-solid fluid or suspension or slurry.

In another embodiment, one or more of the flow cell reactants flow in between the separator layer and the stationary electrodes.

In either case, as the stationary electrodes are charged or discharged, the flow cell cathode slurry or anode slurry can add or remove working ions from the stationary electrodes. For example, after a high power discharge pulse, the stationary negative electrode may be relatively depleted, and the stationary positive electrode relatively saturated, with the working ions. The flow cell cathode slurry and anode slurry can exchange ions with the stationary electrodes to bring the entire cell back towards a charged state, front which it is able to provide another high power discharge pulse. Thus this design can provide high pulse power capability, as is required for electric vehicles, while also providing the high storage energy characteristics of a flow cell.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

The invention claimed is:

1. A bipolar electrochemical cell, comprising:
   an end anode current collector;
   a first ion-permeable membrane spaced from the end anode current collector and at least partially defining a first anode;
   a bipolar electrode including an anode current collector and a cathode current collector, the bipolar electrode spaced from the first ion-permeable membrane and at least partially defining a first cathode between the first ion-permeable membrane and the cathode current collector of the bipolar current collector;

a second ion-permeable membrane spaced from the bipolar electrode and at least partially defining a second anode between the second ion-permeable membrane and the anode current collector of the bipolar current collector; and an end cathode current collector spaced from the second ion-permeable membrane and at least partially defining a second cathode between the end cathode current collector and the second ion-permeable membrane, wherein at least one of the first anode, the second anode, the first cathode, and the second cathode includes a semi-solid or condensed liquid ion-storing redox composition, and wherein the semi-solid or condensed liquid ion-storing redox composition is capable of taking up or releasing ions, and remains substantially insoluble during operation of the cell.

2. The bipolar electrochemical cell of claim 1, wherein the semi-solid or condensed liquid ion-storing redox composition includes an active material.

3. The bipolar electrochemical cell of claim 2, wherein a volume percentage of the active material is between 20% and 70%.

4. The bipolar electrochemical cell of claim 2, wherein the semi-solid or condensed liquid ion storing redox composition includes a conductive additive.

5. The bipolar electrochemical cell of claim 1, wherein the bipolar electrochemical cell is a flow cell.

6. The bipolar electrochemical cell of claim 1, wherein at least one of the first anode, the second anode, the first cathode, and the second cathode includes the semi-solid ion-storing redox composition, the semi-solid ion-storing redox composition comprising a slurry.

7. The bipolar electrochemical cell of claim 1, wherein at least one of the first anode, the second anode, the first cathode, and the second cathode includes the semi-solid ion-storing redox composition, the semi-solid ion-storing redox composition comprising a particle suspension.

8. The bipolar electrochemical cell of claim 1, wherein at least one of the first anode, the second anode, the first cathode, and the second cathode includes the semi-solid ion-storing redox composition, the semi-solid ion-storing redox composition comprising a colloidal suspension.

9. The bipolar electrochemical cell of claim 1, wherein at least one of the first anode, the second anode, the first cathode, and the second cathode includes the semi-solid ion-storing redox composition, the semi-solid ion-storing redox composition comprising an emulsion.

10. The bipolar electrochemical cell of claim 1, wherein at least one of the first anode, the second anode, the first cathode, and the second cathode includes the semi-solid ion-storing redox composition, the semi-solid ion-storing redox composition comprising a micelle.

11. The bipolar electrochemical cell of claim 1, wherein the bipolar electrode includes an insulator disposed between the anode current collector and the cathode current collector.

12. A bipolar electrochemical cell, comprising:
an end anode current collector;
a first ion-permeable membrane spaced from the end anode current collector and at least partially defining a first anode;
a bipolar electrode including an anode current collector and a cathode current collector, the bipolar electrode spaced from the first ion-permeable membrane and at least partially defining a first cathode between the first ion-permeable membrane and the cathode current collector of the bipolar current collector;

a second ion-permeable membrane spaced from the bipolar electrode and at least partially defining a second anode between the second ion-permeable membrane and anode current collector of the bipolar current collector; and an end cathode current collector spaced from the second ion-permeable membrane and at least partially defining a second cathode between the end cathode current collector and the second ion-permeable membrane, wherein at least one of the first anode, the second anode, the first cathode, and the second cathode includes a semi-solid electrode, the semi-solid electrode including a conductive additive in a non-aqueous liquid electrolyte.

13. The bipolar electrochemical cell of claim 12, wherein the semi-solid electrode includes a suspension of an active material.

14. The bipolar electrochemical cell of claim 13, wherein a volume percentage of the active material is between 20% and 70%.

15. The bipolar electrochemical cell of claim 12, wherein the bipolar electrochemical cell is a flow cell.

16. The bipolar electrochemical cell of claim 12, wherein the bipolar electrode includes an insulator disposed between the anode current collector and the cathode current collector.

17. A bipolar electrochemical cell, comprising:
an end anode, an end cathode, and at least one bipolar electrode disposed between the end anode and the end cathode,
the bipolar electrode including an anode current collector, and a cathode current collector opposite the anode current collector;
a first ion-permeable membrane disposed between the end anode and the cathode current collector of the bipolar electrode; and
a second ion-permeable membrane disposed between the end cathode and the anode current collector of the bipolar electrode,
wherein at least one of the end anode, the end cathode and the at least one bipolar electrode includes a semi-solid electrode, the semi-solid electrode including a suspension of an active material and a conductive additive in a non-aqueous liquid electrolyte.

18. The bipolar electrochemical cell of claim 17, wherein the active material is an active solid phase materials.

19. The bipolar electrochemical cell of claim 18, wherein a volume percentage of the active solid phase material is between 20% and 70%.

20. The bipolar electrochemical cell of claim 17, wherein the bipolar electrochemical cell is a flow cell.

21. The bipolar electrochemical cell of claim 17, wherein the bipolar electrode includes an insulator disposed between the anode current collector and the cathode current collector.

* * * * *